United States Patent
Joling

(10) Patent No.: US 12,258,824 B2
(45) Date of Patent: Mar. 25, 2025

(54) DRILLING FLUID DILUTION SYSTEM

(71) Applicant: Schlumberger Technology Corporation, Sugar Land, TX (US)

(72) Inventor: Michael Joling, Bridgeville, PA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/702,972

(22) PCT Filed: Oct. 20, 2022

(86) PCT No.: PCT/US2022/078457
§ 371 (c)(1),
(2) Date: Apr. 19, 2024

(87) PCT Pub. No.: WO2023/070050
PCT Pub. Date: Apr. 27, 2023

(65) Prior Publication Data
US 2024/0328266 A1 Oct. 3, 2024

Related U.S. Application Data

(60) Provisional application No. 63/257,641, filed on Oct. 20, 2021.

(51) Int. Cl.
*E21B 21/06* (2006.01)
*E21B 7/18* (2006.01)
*E21B 47/12* (2012.01)

(52) U.S. Cl.
CPC .............. *E21B 21/065* (2013.01); *E21B 7/18* (2013.01); *E21B 47/138* (2020.05)

(58) Field of Classification Search
CPC ......... E21B 21/065; E21B 47/138; E21B 7/18
See application file for complete search history.

(56) References Cited

U.S. PATENT DOCUMENTS

| 4,794,806 A | 1/1989 | Nicoli | |
|---|---|---|---|
| 2010/0046316 A1 | 2/2010 | Hughes | |
| 2018/0193775 A1* | 7/2018 | Ross | B01D 53/72 |
| 2018/0244973 A1* | 8/2018 | Miller | C09K 8/36 |
| 2019/0063193 A1 | 2/2019 | Pavlov | |

(Continued)

OTHER PUBLICATIONS

International Search Report and Written Opinion issued in International Patent application PCT/US2022/078457 on Feb. 8, 2023, 7 pages.

(Continued)

*Primary Examiner* — P. Macade Nichols
(74) *Attorney, Agent, or Firm* — Jeffrey D. Frantz

(57) ABSTRACT

A method can include receiving a target density value for a drilling fluid exiting a sedimentation device; receiving a measured density value for the drilling fluid directed to the sedimentation device, a measured density value for the drilling fluid exiting the sedimentation device, and an incoming flow rate value for the drilling fluid directed to the sedimentation device; and generating control instructions for control of an injection pump to regulate a diluent injection pump rate to dilute the drilling fluid entering the sedimentation device to achieve the target density value.

19 Claims, 15 Drawing Sheets

(56) References Cited

U.S. PATENT DOCUMENTS

2024/0328266 A1* 10/2024 Joling ................ E21B 47/138

OTHER PUBLICATIONS

Lei et al., Development and application of ZM-2 drilling fluid density adjustment mixing device, Natural Gas Industry B, Jun. 17, 2015, vol. 2, Issue 1, pp. 1-13.
Vestavik et al., Horizontal Drilling with Dual Channel Drill Pipe, In: SPE/IADC Drilling Conference and Exhibition, Mar. 14, 2017, pp. 1-14.
International Preliminary Report on Patentability issued in International Patent application PCT/US2022/078457, dated May 2, 2024, 6 pages.

* cited by examiner

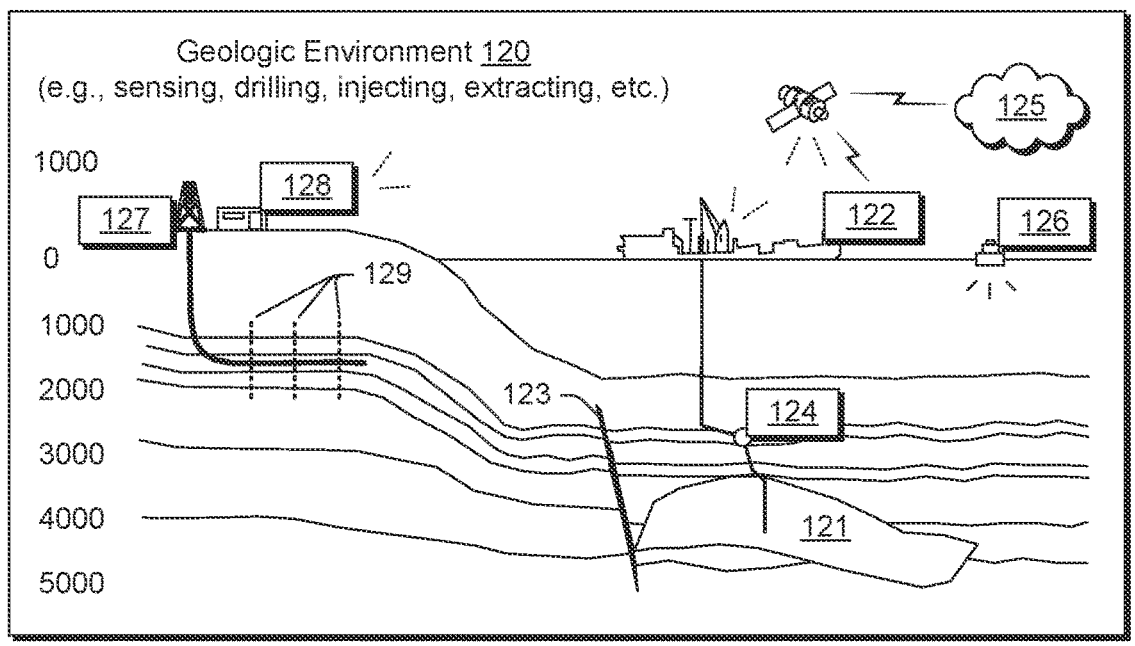
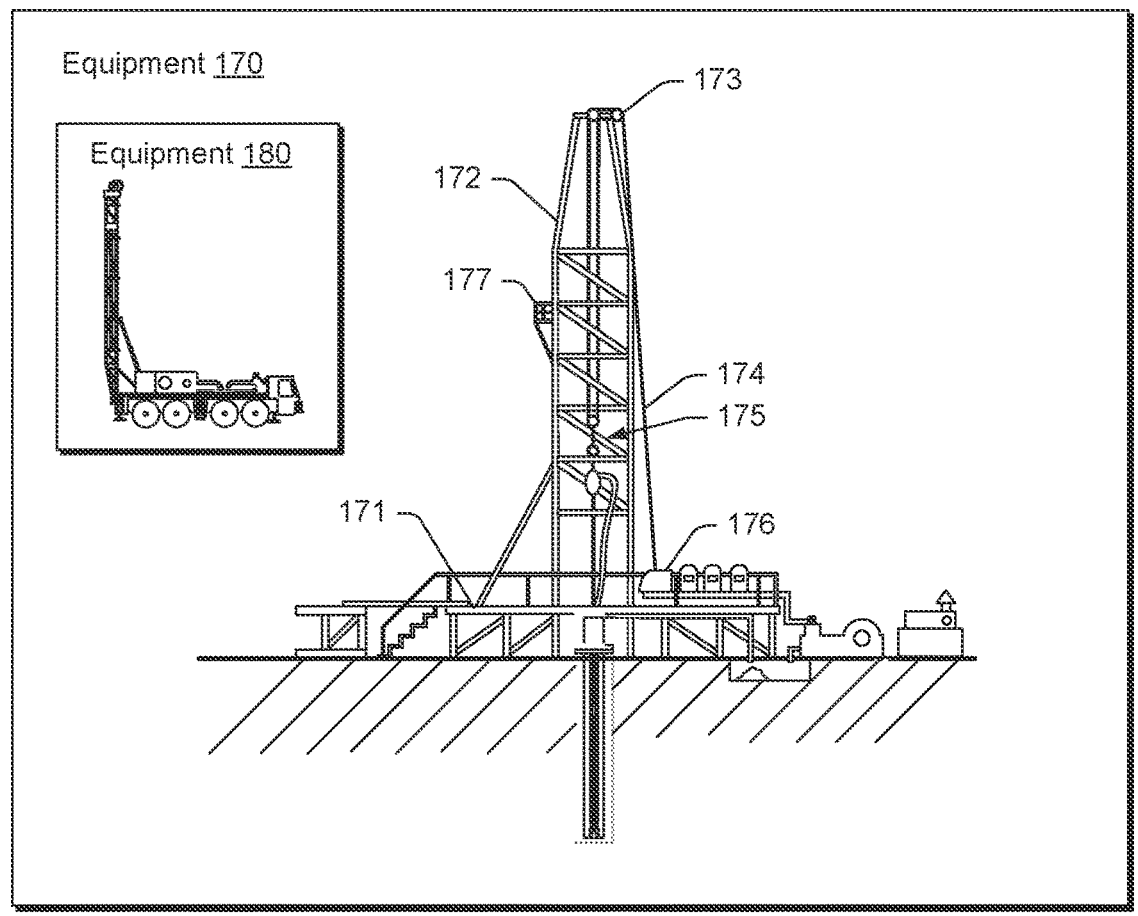
Fig. 1

| 400 | |
|---|---|
| Data Harvest to Drive Model (inputs) | |
| Circulating Volume | 1400 |
| Hole Diameter (inches) | 8.5 |
| MW (PPG) | 12.5 |
| TCS% | 26 |
| LGS% | 12 |
| HGS% + Salt% | 14 |
| Ave. SG of Solids | 3.5 |
| Base Oil SG | 0.77 |
| Planned Average ROP (ft/h) | 200 |
| | |
| Measurements to Drive Model (inputs) | |
| Primary Shaker SRE% | 60 |
| Actual Recovery Effluent Weight (PPG) | 10.8 |
| Actual Polisher Effluent Weight (w/o Injection) | 9.5 |
| Target Polisher Effluent Weight (w/Injection) | 8.3 |
| Actual Injection Rate to Achieve Target PPG (GPM) | 4 |
| Max Polisher Feed Rate Achieved (actual GPM) | 55 |
| Circulating Hours | 22 |
| % LGS in Make Up Fluid | 4 |
| Actual Base Fluid Add in Addition to Injection | 25 |
| | |
| Prescribed SOP (outputs) | |
| Target Recovery Effluent Weight (PPG) | 10.8 |
| Calculated Injected Base Oil to Achieve Target Effluent Density (GPM) | 7.9518 |
| Cut at Target Effluent (PPG/M) (at actual injection) | 1.896 |
| Actual Removal Rate w/Injection (PPG/M) | 104 |
| Solids Balance If Injection Plan is Utilized (BBL/h) | 2.55 |
| Apparent Removal Injection Technique Utilized (BBL) | 337 |
| Solids Carried FWD If Injection Technique Utilized (BBL) | 140 |
| Make Up Fluid Less Injection (BBL - Min. Assumption) | 449 |
| LGS Add from Make Up Fluid (Injection Model) | 18 |
| Expected LGS Post Injection, No Whole Mud Dilution | N/A |
| Actual Injected Volume (BBL) | 126 |
| Pit Dilution Demand In Addition To Injection (BBL) | 1 |
| Total Dilution Actual (Injected Volumes + Actuatl Base Oil Add) (BBL) | 151 |
| Expected LGS% (BO Injection + Pit Dilution) | 7.9 |
| Expected LGS (w/o BO Injection, M/U + Pit Dilution) | N/A |

Fig. 4

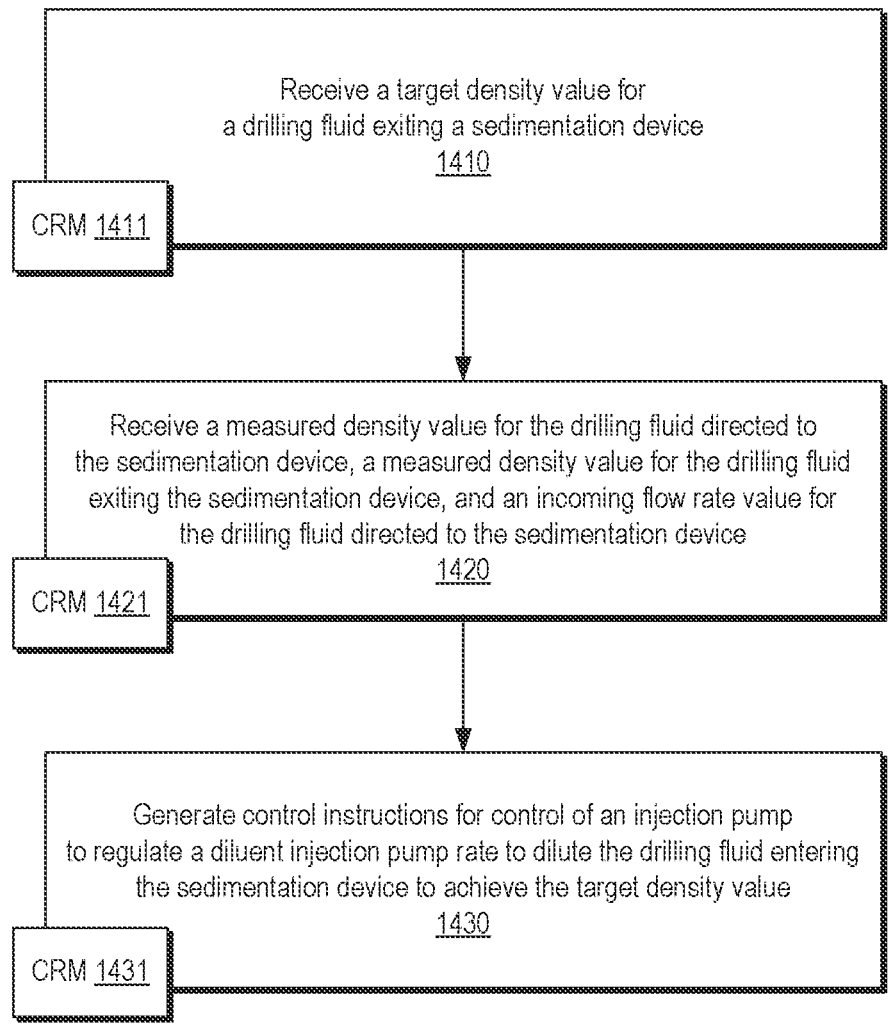
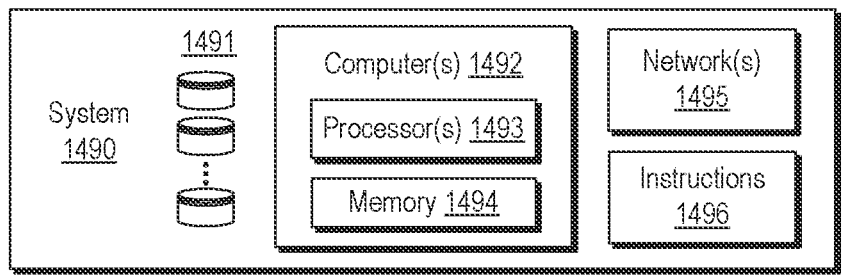
Fig. 14

DRILLING FLUID DILUTION SYSTEM

RELATED APPLICATION

This application is a National Stage Entry of International Application No. PCT/US2022/078457, filed 20 Oct. 2022, which claims priority to and the benefit of a U.S. Provisional Application having Ser. No. 63/257,641, filed 20 Oct. 2021, which is incorporated by reference herein.

BACKGROUND

The maintenance of drilling fluids has historically been separated into two functions: chemical treatment, or solids control. Both seek the same end, to achieve the desired flow properties, or rheology, as dictated by the known best practices for the lithographic target. Unfortunately, the two disciplines are often so siloed that while they are two tools in the same bag, they are deployed as separate entities. In the worst scenarios, the plans of one entity will correlate directly to efficiency loss for the other.

SUMMARY

A method can include receiving a target density value for a drilling fluid exiting a sedimentation device; receiving a measured density value for the drilling fluid directed to the sedimentation device, a measured density value for the drilling fluid exiting the sedimentation device, and an incoming flow rate value for the drilling fluid directed to the sedimentation device; and generating control instructions for control of an injection pump to regulate a diluent injection pump rate to dilute the drilling fluid entering the sedimentation device to achieve the target density value. A system can include a processor; memory accessible by the processor; processor-executable instructions stored in the memory and executable to instruct the system to: receive a target density value for a drilling fluid exiting a sedimentation device; receive a measured density value for the drilling fluid directed to the sedimentation device, a measured density value for the drilling fluid exiting the sedimentation device, and an incoming flow rate value for the drilling fluid directed to the sedimentation device; and generate control instructions for control of an injection pump to regulate a diluent injection pump rate to dilute the drilling fluid entering the sedimentation device to achieve the target density value. One or more computer-readable storage media can include processor-executable instructions to instruct a computing system to: receive a target density value for a drilling fluid exiting a sedimentation device; receive a measured density value for the drilling fluid directed to the sedimentation device, a measured density value for the drilling fluid exiting the sedimentation device, and an incoming flow rate value for the drilling fluid directed to the sedimentation device; and generate control instructions for control of an injection pump to regulate a diluent injection pump rate to dilute the drilling fluid entering the sedimentation device to achieve the target density value. A system can include a controller that includes: one or more interfaces for receipt of a measured density value for drilling fluid directed to a sedimentation device, a measured density value for the drilling fluid exiting the sedimentation device, and an incoming flow rate value for the drilling fluid directed to the sedimentation device and for transmission of a control signal to an injection pump for pumping diluent into the drilling fluid before the sedimentation device; and control circuitry for generation of the control signal based at least in part on one or more of the measured density values and the incoming flow rate value. In such an example, the control circuitry can include a processor and memory accessible to the processor to execute instructions to generate the control signal. A skid-mounted system can include fluid meters; a diluent injection pump; and a controller that includes control circuitry for generation of a control signal for the diluent injection pump based at least in part on one or more outputs of the fluid meters for dilution of drilling fluid. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates examples of equipment in a geologic environment;

FIG. 4 illustrates an example of a table;
FIG. 14 illustrates an example of a method and an example of a system.

DETAILED DESCRIPTION

Figure 2:
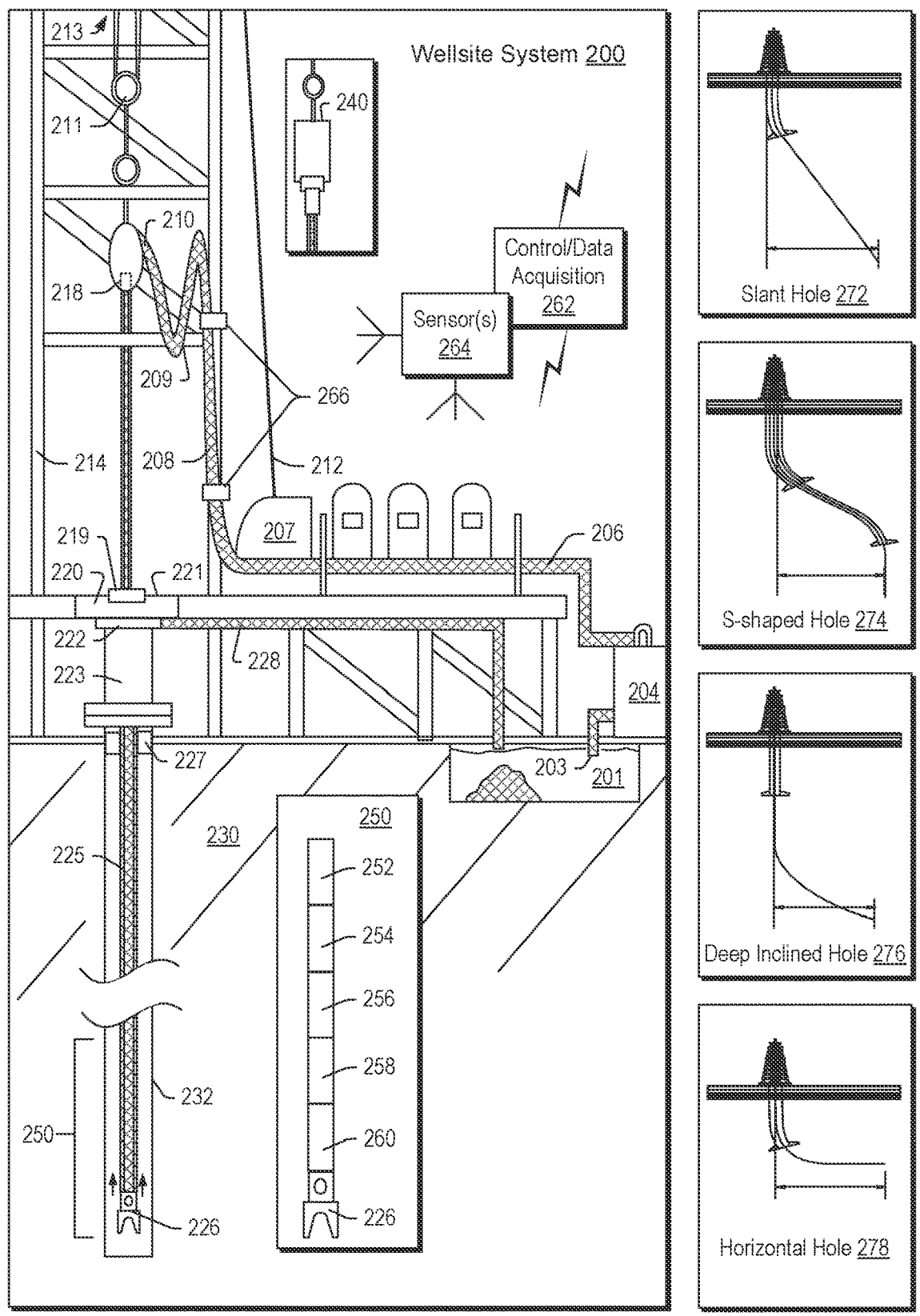
FIG. 2 illustrates examples of equipment and examples of hole types.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc.

As an example, one or more pieces of equipment may provide for measurement, collection, communication, storage, analysis, etc. of data (e.g., for one or more produced resources, etc.). As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrickman may be a rig crew member that works on a platform attached to a derrick or a mast. A derrick can include a landing on which a derrickman may stand. As an example, such a landing may be about 10 meters or more above a rig floor. In an operation referred to as trip out of the hole (TOH), a derrickman may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrickman controls the machinery rather than physically handling the pipe.

As an example, a trip may refer to the act of pulling equipment from a bore and/or placing equipment in a bore. As an example, equipment may include a drillstring that can be pulled out of a hole and/or placed or replaced in a hole. As an example, a pipe trip may be performed where a drill bit has dulled or has otherwise ceased to drill efficiently and is to be replaced.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end.

As an example, the drillstring assembly 250 may be a bottom hole assembly (BHA).

The wellsite system 200 can provide for operation of the drillstring 225 and other operations. As shown, the wellsite system 200 includes the platform 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drillstring 225 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drillstring 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system (RSS) and/or motor 260, and the drill bit 226. Such components or modules may be referred to as tools where a drillstring can include a plurality of tools.

As to a RSS, it involves technology utilized for directional drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit (e.g., during directional drilling, etc.). A PDM operates as drilling fluid is pumped through it where the PDM converts hydraulic power of the drilling fluid into mechanical power to cause the bit to rotate.

As an example, a PDM may operate in a combined rotating mode where surface equipment is utilized to rotate a bit of a drillstring (e.g., a rotary table, a top drive, etc.) by rotating the entire drillstring and where drilling fluid is utilized to rotate the bit of the drillstring. In such an example, a surface RPM (SRPM) may be determined by use of the surface equipment and a downhole RPM of the mud motor may be determined using various factors related to flow of drilling fluid, mud motor type, etc. As an example, in the combined rotating mode, bit RPM can be determined or estimated as a sum of the SRPM and the mud motor RPM, assuming the SRPM and the mud motor RPM are in the same direction.

As an example, a PDM mud motor can operate in a so-called sliding mode, when the drillstring is not rotated from the surface. In such an example, a bit RPM can be determined or estimated based on the RPM of the mud motor.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of one or more of a RSS, a downhole motor and/or a turbine. As to a motor, for example, a drillstring can include a positive displacement motor (PDM).

As an example, a system may be a steerable system and include equipment to perform a method such as geosteering. As an example, a steerable system can include a PDM or a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena;

one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", this can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
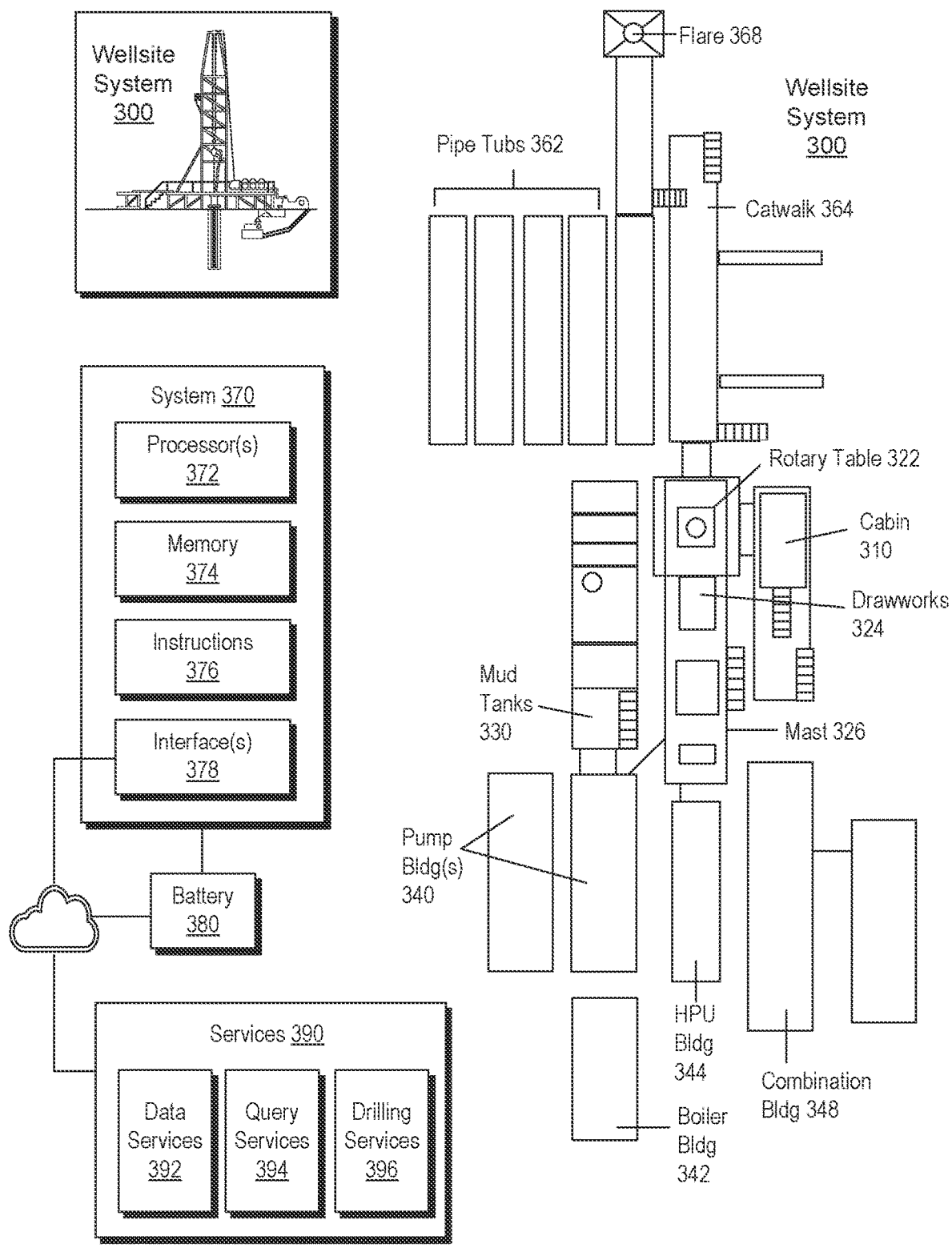
FIG. 3 illustrates an example of a system.

FIG. 3 shows an example of a wellsite system 300, specifically, FIG. 3 shows the wellsite system 300 in an approximate side view and an approximate plan view along with a block diagram of a system 370.

In the example of FIG. 3, the wellsite system 300 can include a cabin 310, a rotary table 322, drawworks 324, a mast 326 (e.g., optionally carrying a top drive, etc.), mud tanks 330 (e.g., with one or more pumps, one or more shakers, etc.), one or more pump buildings 340, a boiler building 342, a hydraulic pumping units (HPU) building 344 (e.g., with a rig fuel tank, etc.), a combination building 348 (e.g., with one or more generators, etc.), pipe tubs 362, a catwalk 364, a flare 368, etc. Such equipment can include one or more associated functions and/or one or more associated operational risks, which may be risks as to time, resources, and/or humans.

A wellsite can include a prime mover as a source of power. As an example, a prime mover can include one to four or more diesel engines, which may produce several thousand horsepower. Such engines can be operatively coupled to one or more electric generators. Electrical power may be distributed by a silicon-controlled-rectifier (SCR) system. Rigs that convert diesel power to electricity may be referred to as electric rigs or diesel electric rigs. As an example, a rig can be configured for transmission of power from one or more diesel engines to one or more rig components (e.g., drawworks, pumps, rotary table, etc.) through mechanical belts, chains, clutches, etc. Such a configuration may be referred to a mechanical rig or a so-called "power rig".

As shown in the example of FIG. 3, the wellsite system 300 can include a system 370 that includes one or more processors 372, memory 374 operatively coupled to at least one of the one or more processors 372, instructions 376 that can be, for example, stored in the memory 374, and one or more interfaces 378. As an example, the system 370 can include one or more processor-readable media that include processor-executable instructions executable by at least one of the one or more processors 372 to cause the system 370 to control one or more aspects of the wellsite system 300. In such an example, the memory 374 can be or include the one or more processor-readable media where the processor-executable instructions can be or include instructions. As an example, a processor-readable medium can be a computer-readable storage medium that is not a signal and that is not a carrier wave.

FIG. 3 also shows a battery 380 that may be operatively coupled to the system 370, for example, to power the system 370. As an example, the battery 380 may be a back-up battery that operates when another power supply is unavailable for powering the system 370. As an example, the battery 380 may be operatively coupled to a network, which may be a cloud network. As an example, the battery 380 can include smart battery circuitry and may be operatively coupled to one or more pieces of equipment via a system management bus (SMBus) or other type of bus.

In the example of FIG. 3, services 390 are shown as being available, for example, via a cloud platform. Such services can include data services 392, query services 394 and drilling services 396. As an example, the services 390 may be part of a system such as the system 200 of FIG. 2.

As an example, a system such as, for example, the system 300 of FIG. 3 may be utilized to perform a workflow. Such a system may be distributed and allow for collaborative workflow interactions and may be considered to be a platform (e.g., a framework for collaborative interactions, etc.).

As an example, a workflow may progress to a geology and geophysics ("G&G") service provider, which may generate a well trajectory, which may involve execution of one or more G&G software packages. Examples of such software packages include the PETREL framework. As an example, a system or systems may utilize a framework such as the DELFI framework (Schlumberger Limited, Houston, Texas). Such a framework may operatively couple various other frameworks to provide for a multi-framework workspace.

As an example, a G&G service provider may determine a well trajectory or a section thereof, based on, for example, one or more model(s) provided by a formation evaluation, and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

As explained, various operations can pertain to drilling fluid, which may be referred to as a mud. As to an oil-based mud (OBM or oil-based drilling fluid), it may be an invert-emulsion mud, or an emulsion whose continuous phase is oil. Various types of commercial oil muds may be formulated with 5 vol. percent water or more or less than 5 vol. percent water. Various types of nonwater-base drilling fluids can include synthetic fluid (e.g., ethers, esters, olefin oligomers, blends, etc.), diesel oil, and/or mineral oil (e.g., ordinary and enhanced purity). As to water-base muds, they can be defined as drilling fluid (mud) in which water or saltwater is the major liquid phase as well as the wetting (external) phase. General categories of water-base muds include fresh water, seawater, salt water, lime, potassium and silicate. As an example, a water-base mud can be a clear water, clay base, silicate, clay and polymer, polymer with low or no clay, clear brine, etc.

Various types of muds (e.g., drilling fluids, lubricants, etc.) may take time and resources to formulate. For example, consider a recipe for making mud that commences with one or more base materials, one or more ingredients, one or more premixes, etc., where the order of ingredients, mixing times, temperatures, etc., may be controlled. A formulated mud may be of considerable value and suitable for reuse. For example, after an operation is performed, at least a portion of the mud may be collected (e.g., in a tank, etc.) and transported to another site for use. As mentioned, where mud becomes contaminated beyond an acceptable level, processing and/or disposal may be options, which can add cost, time, resources, etc. In various examples, formation fluid may be sampled from a downhole environment in a manner that may help to preserve mud such that it does not become contaminated to a level that would demand substantial processing to clean the mud or that would result in disposal, which may be of an increased cost where hydrocarbon content is elevated. Further, as to disposal, various regulations can exist that control how and/or where mud is disposed. In general, mud with less contamination is easier and less expensive to handle than mud with more contamination.

As an example, a method for sampling formation fluid that includes hydrocarbons can reduce contamination of drilling fluid. In such an example, drilling fluid may be amenable for reuse and/or recycling where, for example, if drilling is involved, cuttings can be removed to recover the base fluid for reuse. In such an example, the base fluid can be stored, mixed with other mud, etc. In instances where mud is utilized as a lubricant without drilling, it may still carry solids, which may be removed such that a base fluid can be reused. In either instance (e.g., drilling or non-drilling) where formation fluid sampling is involved, a method that reduces contact between formation fluid and mud can help to preserve the mud (e.g., reduce risk of contamination).

In various instances, muds are leased from a drilling fluid company such that they can be recycled and reused. Some companies demand that certain drilling fluid properties are to be met before the mud is returned to a plant, otherwise a conditioning process and associated charge may apply. As to properties, these can include one or more of weight, viscosity, water ratio and low gravity solids content, various properties of which may be impacted by formation fluid hydrocarbons; noting that hydrocarbon composition and/or content may be regulated as well.

As explained, the maintenance of drilling fluids (e.g., muds) for various operations has historically been separated into two functions: chemical treatment, or solids control. Both seek the same end, to achieve the desired flow properties, or rheology, as dictated by the known best practices for the lithographic target. As an example, a framework can be utilized to provide for handling of drilling fluids by performing one or more methods using field equipment. Such an approach can provide for increased efficiency, performance, etc. As an example, a framework may operate to unite functions in reciprocity. That is, that by viewing fluid maintenance as a singular goal with simultaneous, yet related process loops, a framework can utilize portions of each maintenance tool to achieve a substantial impact (e.g., as to efficiency, performance, etc.).

As an example, consider dilution where addition of dilutive volumes to a body of drilling fluid is part of various drilling operations. A goal, though there may be more than one goal, can be to aid in the maintenance of target solids concentrations, in particular, low gravity solids concentrations. As an example, this goal may be in a range of approximately 6 percent to approximately 10 percent by volume.

Dilution is performed in an effort to maintain a desired concentration when the volume quantity (solids volumes) or quality (solids size) becomes untenable for mechanical removal equipment. Given that flow properties, in general, play a determinative role in fluid performance, and that removal of low gravity solids is paramount to limiting dilutive intervention, a framework can operate in a manner to best serve in the application of dilution.

Fluid performance can be characterized by fluid ability to perform its base functions, which can include: 1) to act as a well barrier, 2) suspension of solids, 3) evacuation of solids from a well bore, 4) to deliver horsepower to down hole tools (e.g., mud motors, mud turbines, etc.), and one or more other lesser functions of which can be impacted by quality and quantity of the solids present in the fluid and chemical and physical processes imparted upon fluid to maintain performance. As an example, a framework can provide for calculating and preplanning volume required and process of introduction.

As an example, a framework can consider the following scenario where, for a known fluid volume, a known desired dilutive quality, a known mechanical capability (e.g., rate of removal and quality of the solids removed, including solids size), the framework can calculate dilution required. In such an example, the framework can use a mass balance technique to help insure that solids are removed from solids from drilling at a rate at which they are being generated from drilling. In such an example, the framework accomplished such a task by understanding the rate at which solids are introduced versus the rate at which they are being removed. Understanding the difference allows the framework to pre-plan physical removal and chemical treatment plans. In such an example, knowledge of the difference can be leveraged in such a way that chemical treatment and mechanical processes are aligned to achieve efficiency gains in both.

As an example, a method can include scalping or recovery, which is the act of removing the largest, most dense available particles for the purposes of reintroduction to the fluid system. Such a process can be a first or other early action in isolating particles targeted for discharge from a fluid system. Such a method can aim to perform consistent computations, for example, in utilizing barrels as the volumetric measurement, and pounds per gallon as the density measurement. As an example, an initial concentration of solids can be obtained by running a mud check on a target fluid. In such an approach, high gravity solids concentrations percentages (HGS %) can be applied against whole fluid density (mud weight, MW) to arrive at a scalping density that is a target stage 1 centrifuge effluent density (e.g., the feed density of a stage 2 centrifuge). Such an approach can consolidate low gravity solids (LGS %) targeted for removal at stage 2 in the stage 1 effluent. For example, consider the following equation:

$$\text{Scalping Density} = MW - (HGS\% * MW) \quad (1)$$

As to a quality target, a clean slurry density, or the density of the emulsion containing the chemical and beneficial solids constituents can be utilized as the effluent quality target, represented in pounds per gallon (PPG). As an example, a stage 2 centrifuge can receive a stage 1 effluent and be calibrated to achieve the greatest possible reduction in density from feed to effluent at a reasonable feed rate. In such an example, the difference between the stage 2 effluent density and the desired clean slurry density, at the feed rate, can represent the minimum dilution (e.g., given as a rate of injection into the feed) required. For example, consider the following equation:

$$\text{Injection Rate } (gpm) = (((A2E * A2R) - (T2E * A2R))/T2E) \quad (2)$$

A2E=Actual Stage 2 Effluent Density (lb/gal)
A2R=Actual Stage 2 Feed Rate (gpm)
T2E=Target Stage 2 Effluent Density (lb/gal)

As an example, a 20/20 rule may be applied. For example, having determined the injection rate of dilution, a method may implement a ramp for actual introduction. That is, if Equation (2) resulted in a prescribed injection rate of 10 gpm, an actual injection operation would inject in 20 percent increments (e.g., 2 gpm in the example) acquiring stage 2 effluent density readings in between ramp ups. As an example, ramp up in injection rate may occur every 20 minutes until the target effluent density is achieved.

As to analyzing removal results, due to the reduction in viscosity and increase in density difference between the fluid and solids substrates, an operation may reach the target effluent density prior to reaching the calculated injection rate. Upon reaching the target effluent density, a measurement of the injection rate can be taken. As an example, a difference between a prescribed, calculated dilution injection rate and an actual injection rate can represent the gain in mechanical removal efficiency represented as the "cut" in pounds per gallon. For example, it may be calculated and compared to a non-injected "cut". As an example, consider the following equations:

$$\text{Unit of measure} = PPG/\text{min} \quad (3)$$

$$\text{No injection Cut } (NC) = A1E - A2E$$

$$\text{Injection Cut } (IC) = A1E - T2E$$

$$\text{Efficiency Gain } (EG) = IC - NC$$

$$\text{Removal Rate in } (RR) = IC * FR$$

NC=Cut rate without injection
IC=Cut Rate with injections
EG=Improvement to mechanical cut rate utilizing the injection technique As to reducing dilution with dilution, ultimately, by having known rates of penetration (solids addition rate), and by having a known discard rate, and having improved that discard rate via the introduction of base fluids to a centrifuge feed, a framework can compute a dilution rate commensurate to a calculated deficit in removal. As an example, a framework may act in a manner such that as removal potential is maximized, dilution potential is minimized. For example, consider a mass balance that may be achieved using the following equations:

$$\text{Planned Solids Loading } (PSL) = ROP * (HD^2/1029.4) \qquad (4)$$

$$\text{Mud check Solids Requiring Removal } (IV) = \%LGS * \text{Volume}$$

$$\text{Solids Removed by Flowline Shakers } (FSRE) = SRE * PSL$$

$$\text{Solids Balance to Centrifuge } (SBC) = PSL + IV - FSRE$$

$$\text{Solids requiring dilution } (SD) = SBC - ((RR * 60)/21.65)/42)$$

As an example, a framework may be implemented using an application, which may be local, remote or local and remote. For example, consider an application installed locally and/or remotely. As an example, consider a mobile and/or a desktop application, which may provide a field operator an opportunity to actively model a change to a process as one or more adjustments are made. As an example, a framework may provide an ability to produce a daily report and save it for further trend and customer analysis. As an example, a framework may be operatively coupled to one or more pieces of equipment for purposes of data acquisition and/or control.

FIG. 4 shows an example of a table 400 that may be generated as a report by a framework. For example, the table 400 can be a daily report provided by an application. In the example of FIG. 4, the table 400 includes data harvest to drive model as inputs, measurements to drive model as inputs and prescribed standard operating procedure (SOP) outputs. In such an example, the outputs can represent parameters for application in the field where such outputs are based on data, for example, gleaned from a mud report where measurements can be ascertained as per one or more field techniques (e.g., sensors, measurement assemblies, operators, etc.).

As an example, a framework can provide for at least some amount of automation. For example, consider a manual method that can be automated by substituting instruments capable of harvesting one or more manual measurements described in a live fashion to form an automated dilution framework. For example, consider use of one or more Coriolis flow meters that may be placed at a feed to a polishing device (e.g., a centrifuge) and at a pumped return of the polishing device effluent to the whole fluid body. As an example, a relatively low cost flow meter (e.g., in comparison to a Coriolis flow meter) may be placed at a pump supplying base oil injection to the polishing device. Such instruments may be distributed separately and/or contained in a housing (e.g., a cabinet), for example, with appropriate plumbing and electrical inlets/outlets.

As an example, a flow meter can include one or more sensor tubes (e.g., U sensor tubes, etc.) that may provide for a split of incoming flow where the U sensor tubes oscillate at a natural resonant frequency via driver components. In such an example, the flow meter can include the sensor components as magnet and coil assembly pickoffs that can measure voltage amplitudes with respect to time (e.g., sine waves, etc.). When fluid flows in the pair of U sensor tubes, the Coriolis force causes each of the U sensor tubes to twist in opposition to each other, which results in a phase shift for voltage amplitudes with respect to time (e.g., phase shifted sine waves). In such an example, a time delay between phases can be measured in microseconds where the time delay is proportional to the mass flow rate (e.g., a greater time delay can correspond to a greater mass flow rate). In such an example, frequency can be measured where frequency can provide an indication of density. For example, consider Hooke's law where a tube can be a spring and mass of a tube and fluid therein can be considered a mass coupled to the spring. In such an example, density can be estimated as being proportional to the inverse of the frequency squared. As an example, volumetric flow can be determined from mass flow rate and density (e.g., volumetric flow rate=mass flow rate/density).

As an example, a system may be skid-based and suitable for delivery at a wellsite, for example, to be installed in a plug/plumb and play manner. As an example, a target clean density may be set as a target, and a PLC controlled pump may be driven to administer dilution between an automated dilution framework and a separation device (e.g., a centrifuge) at a rate that achieves the target by improving the separation potential of the device and applying a minimum dilution required (e.g., within some amount of tolerance such as plus or minus 10 percent, which may be skewed in one direction). As an example, an automated approach may create a most efficient reciprocity between chemical treatment and mechanical removal using digitized measurement.

Figure 5:
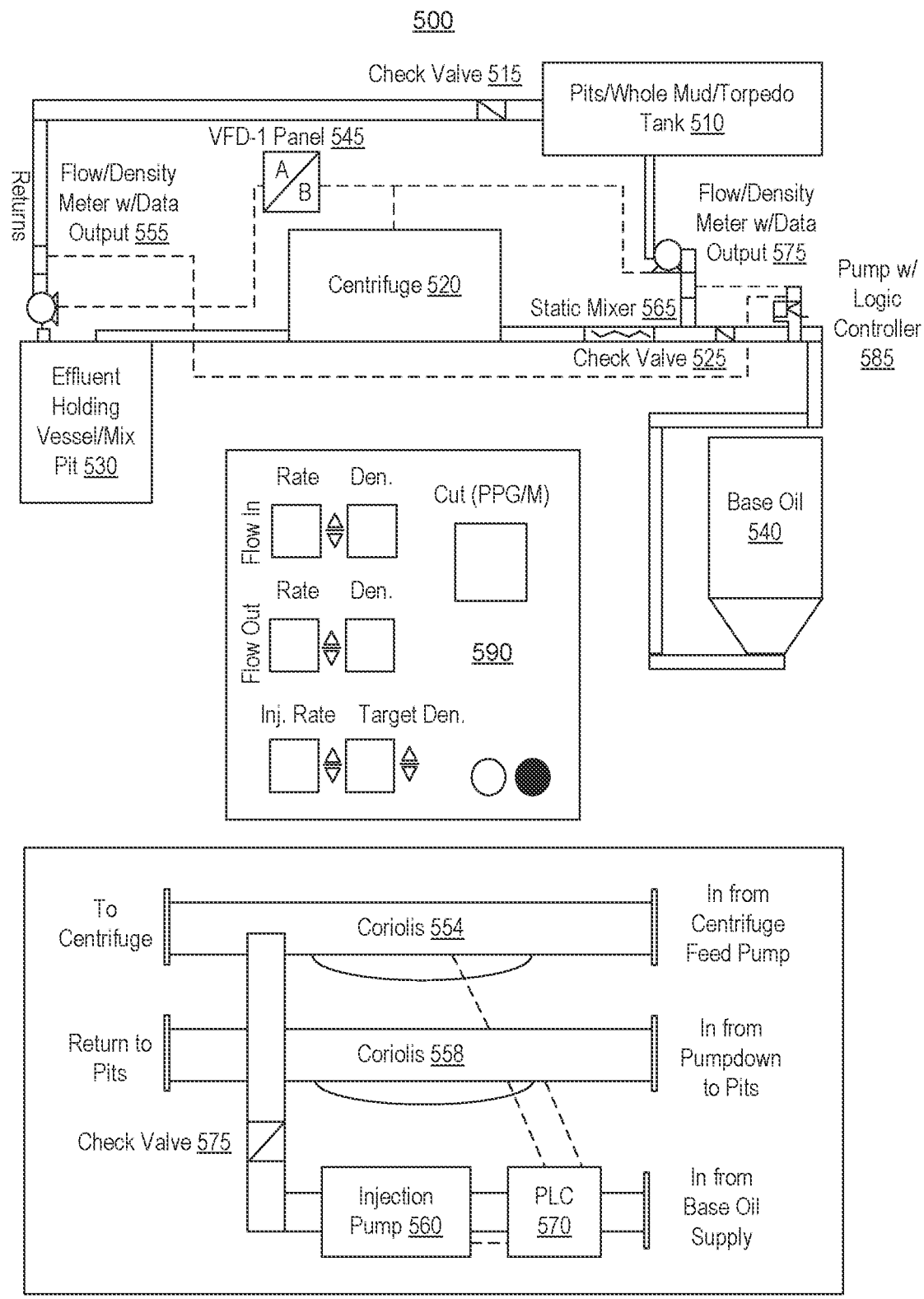
FIG. 5 illustrates an example of a system.

FIG. 5 shows an approximate schematic view of an example of a system 500. In such an example, the system 500 can be a solids control system that can utilize an automated dilution framework. In the example of FIG. 5, the system 500 includes a tank 510 (e.g., a pits, whole mud, torpedo tank), a check valve 515, a centrifuge 520, a check valve 525, a effluent holding vessel/mix pit 530, a base oil tank 540, a variable frequency drive (VFD-1) panel 545, a flow and/or density meter 555, a static mixer 565, a flow and/or density meter 575, and a pump with logic controller 585 (e.g., consider a 20 GPM pump). As shown, various control lines allow for control of various pieces of equipment, which can include pumps, valves, etc.

FIG. 5 also shows an example of the system 500 as including Coriolis meters 554 and 558 as operatively coupled to a PLC 570, which can be operatively coupled to an injection pump 560. As shown, a check valve 575 can be included (see also the check valve 525). As shown, the injection pump 560 can be controlled to inject fluid from a base oil supply (e.g., the base oil tank 540) into one or more streams to the centrifuge 520 and/or to the tank 510, which may be based at least in part on measurements acquired from the Coriolis meters 554 and 558, which receive fluid from the centrifuge feed pump and from the pump-down to pits. As to the PLC 570, it can provide for rendering one or more graphical user interfaces (GUIs) such as, for example, a GUI 590 that can include various fields and controls for various types of information. As explained, the system 500 can include and/or be operatively coupled to a framework that can provide for efficient handling of drilling fluid, particularly dilution where dilution operations may optionally be automated.

As an example, an automated dilution module (ADM), which may be and/or include an automated dilution framework, such an ADM can rely on the general premise that those solids remaining in the fluid post process by the finest removal device present ultimately represent the viscosity inducing solids most harmful to the efficiency of a drilling fluid. Therefore, if such a module understands the volume of that remainder in combination with the rate of feed to said device, the module can calculate the minimum dilution required to maintain a target drill solids concentration. Further, an ADM can operate on the premise that the curative measures that accomplish achieving the targeted concentration, primarily dilution, also have a positive impact when added directly to the influent feed to separation devices. That is, Stokes Law can demonstrate that reductions in viscosity and fluid phase density improve sedimentation rate. Additionally, this can also tend to reduce torque for rotational separation devices such as one or more centrifuges with feed rate or g-force increases as well as cleaner (drier) discharges resultant from a more efficient separation.

In the example of FIG. 5, the system 500 can include an ADM that can determine clean slurry weight; receive live density and rate information from instruments (e.g., sensors, etc.); and drive an injection pump PLC to regulate injection pump rate to achieve a target density. As explained, the system 500 can include various pieces of equipment. As to an ADM, it can include a PLC for instrumentation interfacing or on-board with a pump, a suitable pump with VFD gear-pump control, one or more Coriolis and/or other non-invasive (e.g., electromagnetic) instruments to measure fluid flow an density (e.g., consider two as shown in FIG. 5), and a static mixer. As to controller logic, an ADM may include logic for input of target density, input of actual density and output to an injection pump to increase or decrease injection rate in a manner with respect to actual density input, within some amount of tolerance (e.g., plus and/or minus one percent of density target, 0.1 PPG allowance, etc.).

For achieving operation in an automated fashion, certain measurements can occur in live time (real-time). While an analog system with intermittent readings may be utilized, such an approach may demand extensive physical measurements to be taken by an operator. In contrast, when measurements are taken in a constant live feed, optimization can occur by design. As an example, a framework may operate by, rather than manually adjusting the rate of flow with a specific setting, floating settings based on the instrumented inputs, which can monitor the environment (e.g., in a constant fashion, for example, according to an acquisition frequency or frequencies). Akin to cruise control on a vehicle, which can perform computations to apply more fuel to an engine when a vehicle encounters an incline by monitoring vehicle speed, a framework can monitor density inputs ramping up or down the dilution injection rate accordingly to achieve a target density commensurate to the drill solids concentration goal.

As an example, a framework may be operable where a manual input can be associated with setting a concentration goal (e.g., as the sole manual input). Akin to the previous vehicle example, setting that goal is a way to set a "cruise control" for drilling mud. For reference, an operator may review offset well data for clean mud plant slurries peculiar to a mud system one intends to operate on. Mud plant slurry generally includes mild amounts of low gravity solids, such as organophilic clays, resulting in slightly elevated mud weights beyond a simple fluid phase calculation. As an example, a 70/30 oil to water ratio mud, without solids and utilizing 10.2 PPG brine as the water phase, would weigh approximately 8 PPG. However, an operator may safely assume that there will be an approximately 2 percent to approximately 4 percent beneficial low gravity solids concentration. This will result in typical clean slurry weight of 8.3-8.6 PPG. As an example, an input in this range may be a suitable starting point for goal effluent density.

As an example, having discovered both the target density (e.g., by calculation or local knowledge) as well as the actual density (e.g., by instrumented measurement), while simultaneously measuring the flow rate, a framework can calculate a dilution rate required to absolutely ensure the target density is met at the rate the device is being fed. Further, by understanding density and discard rates, totals can be calculated on intervals (e.g., consistent with a client's common reporting intervals). Such an approach allows for a direct measurement assessment of removal efficiency both in terms of total volume and pace. As an example, a machine operator can become more, or less, aggressive as denoted by a mud engineer's lab results by manipulating either physical machine parameters, namely feed rates, or by adjusting the target effluent density of an ADM. Indicators within a mud report may dictate which response is a prudent response.

As an example, an ADM can be an automating tool that simultaneously optimizes and delivers dilution to a fluid system while enhancing and improving the sedimentation rate of separation equipment, while also operating as a data collection tool that actively tracks, measures and affords operators and/or customers a live view of performance.

As explained, a framework, which may be an ADM, can provide for automation in a manner that acquires physical measurements and on-boards and streamlines tasks in a self-balancing manner. Inputs to an ADM can be few and may be dictated by desk engineers to field personnel and may be easily adjusted onsite through an on-board human-machine interface (HMI). Mechanical optimizations, discovering the in situ mechanical limit of separation devices utilizing an ADM, can change in so far as the ADM expands the mechanical capability of the separation device; otherwise it may remain unchanged.

As to some examples and approaches to inputs, consider:
1) Manual Via HMI
   a. Target polishing device (centrifuge) effluent:
      i. In Pounds per Gallon (PPG).
   b. Calibration cycle start/stop button and/or programmed start/stop:
      i. This allows for a calibration cycle to be run whereby injection of base fluid is halted but all other measurements continue to be harvested.
      ii. Calibration cycles to be manually started and stopped at the HMI, or performed according to predetermined programmed intervals:
         1. This can afford a company an opportunity to measure efficiency gains to mechanical solids removal achieved via a method of automated dilution introduction;
         2. This can afford opportunities to test injection of other sedimentation chemistry utilizing the ADM as the introduction platform;
         3. This can allow an operator the time to manually adjust physical operating parameters of the polishing device insuring mechanical removal optimization.
2) Mechanical Optimization at the Polishing Device's Controls/HMI
   a. During calibration cycles a machine operator can ensure that the polishing device is:
      i. At its maximum g-force in light of machine stressors:
         1. The goal not to overwork the machine but to insure it is optimized.
      ii. Feed rates are commensurate to keeping pace with drilling:
         1. Some charting may evolve for particular machines resultant from instrumented measurement and calculation of discard rates vs. penetration rates (the rate of drill solids additions).

As to some examples and approaches to outputs, consider:
1) Density
   a. The ADM can continuously monitor the density of:
      i. Fluid fed to the polishing device:
         1. From the pit; and
         2. From a transfer vessel (as in barite recovery).
      ii. The effluent of the polishing device:

1. Caught in a transfer vessel and pumped back to the whole mud system.
2) Feed Rates
   a. To the polishing device;
      i. From the pit;
      ii. From a transfer vessel (as in barite recovery);
      iii. From base oil storage:
         1. This flow meter may have both a totalizing and live feed measurement.

As explained, a framework, which may be an ADM can provide for automatic report generation. As an example, a software or application may be provided to interface directly with ADM instrument readings, for example, providing analytical outputs describing, proving, or delineating results, techniques, or outputs of operational logic. In combination with basic mud reporting laboratory data, a daily performance report for the solids control suite may be completely automated. In one or more examples, receipt printers may be placed onboard the units for unmanned sites. Receiving the live and totalized readings from the ADM, the PE (Project Engineer) or operations designee (onsite or other personnel) may make manual entry of the laboratory results (mud engineers report) and imbedded algorithms may produce charting, discard totals, solids removal efficiency or other performance-based rubrics as the customer wishes.

As explained, a framework can aid in building a bridge between chemical and mechanical toolsets for maintenance of drilling fluid. This bridge can allow two related toolsets to perform their tasks in tandem, each to the benefit of the other. Such an approach can increase efficiency in both the performance and cost of the fluid body to which it is applied. Solids removal equipment can become more efficient as it is presented a fluid body more conducive to sedimentation, while chemical treatment and total dilution will decline as a result of improved sedimentation. Furthermore, due to the nature of a framework and its operation, results can be measurable and predictable no matter the starting state of the fluid. This affords the translation of such an approach to instrumented data capture and an automated system, which may interface with one or more other automated systems in its surrounding drilling environment.

As an example, a centrifuge can be made more efficient by the use of a framework that may be or include an ADM. For example, by applying the dilution utilized to the fluid at rate, at density across a centrifuge's non-diluted, or strict mechanical effluent density, can provide for a resultant diluted density that represents what the fluid is expected to weigh if no additional sedimentation advantage is created. As an example, a difference between the diluted density and actual measured density can be both a measurement, and proof, of an additional sedimentation advantage created. As to reducing dilute usages, in a field trial for which an ADM was utilized, the impact of additional solids removed as a result of using the ADM process can be correlated to an equivalent volume of dilute that would produce the same impact on the fluid system as a whole. In the field trial, ADM measurements calculated out to a predicted savings of ~230 BBL of dilute and actual dilute volume saved as compared to non-ADM wells on the same pad equaled 225 BBL less dilute consumed. In the field trial, this represented a tangible reduction in volumes consumed of 27% as compared to offset data average consumption.

Figure 6:
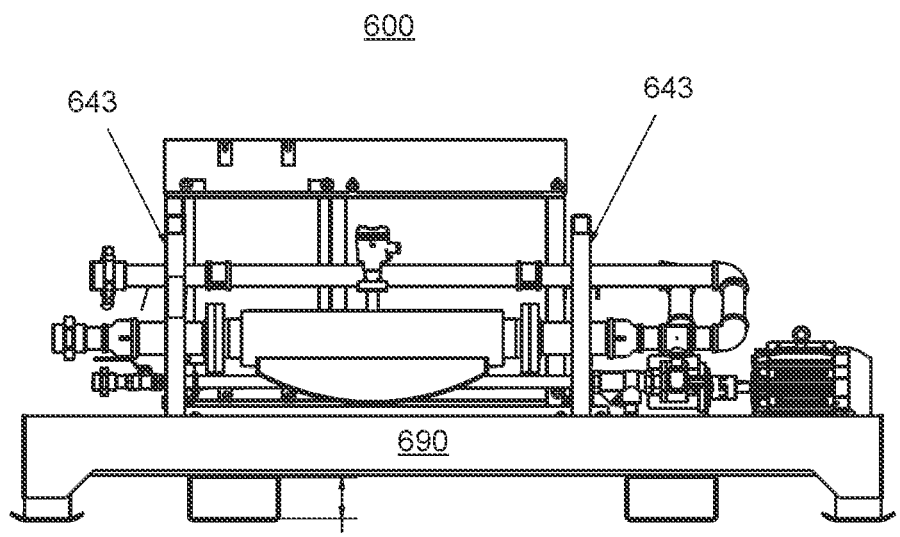
FIG. 6 illustrates an example of a system.
Figure 7:
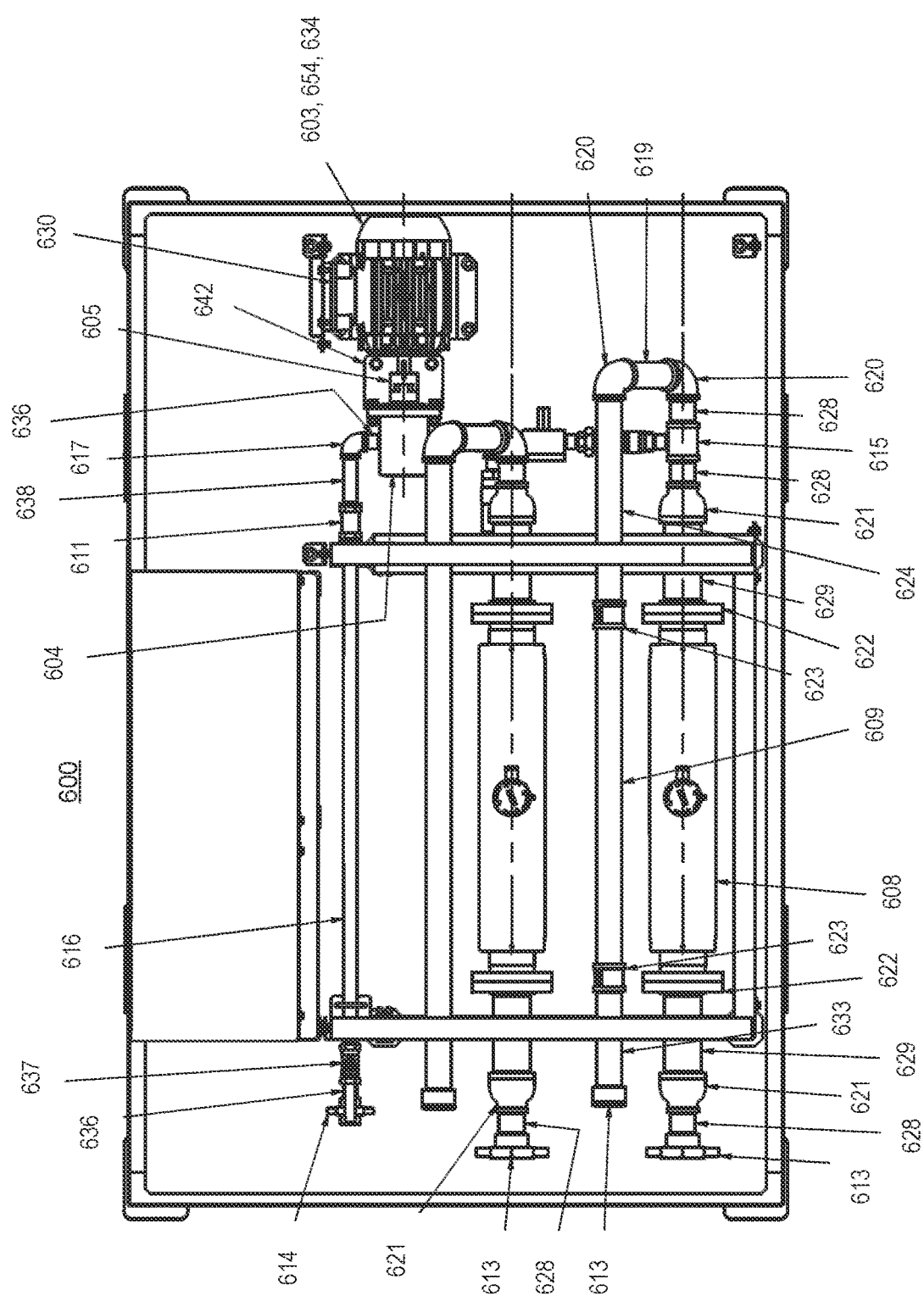
FIG. 7 illustrates an example of a system.
Figure 8:
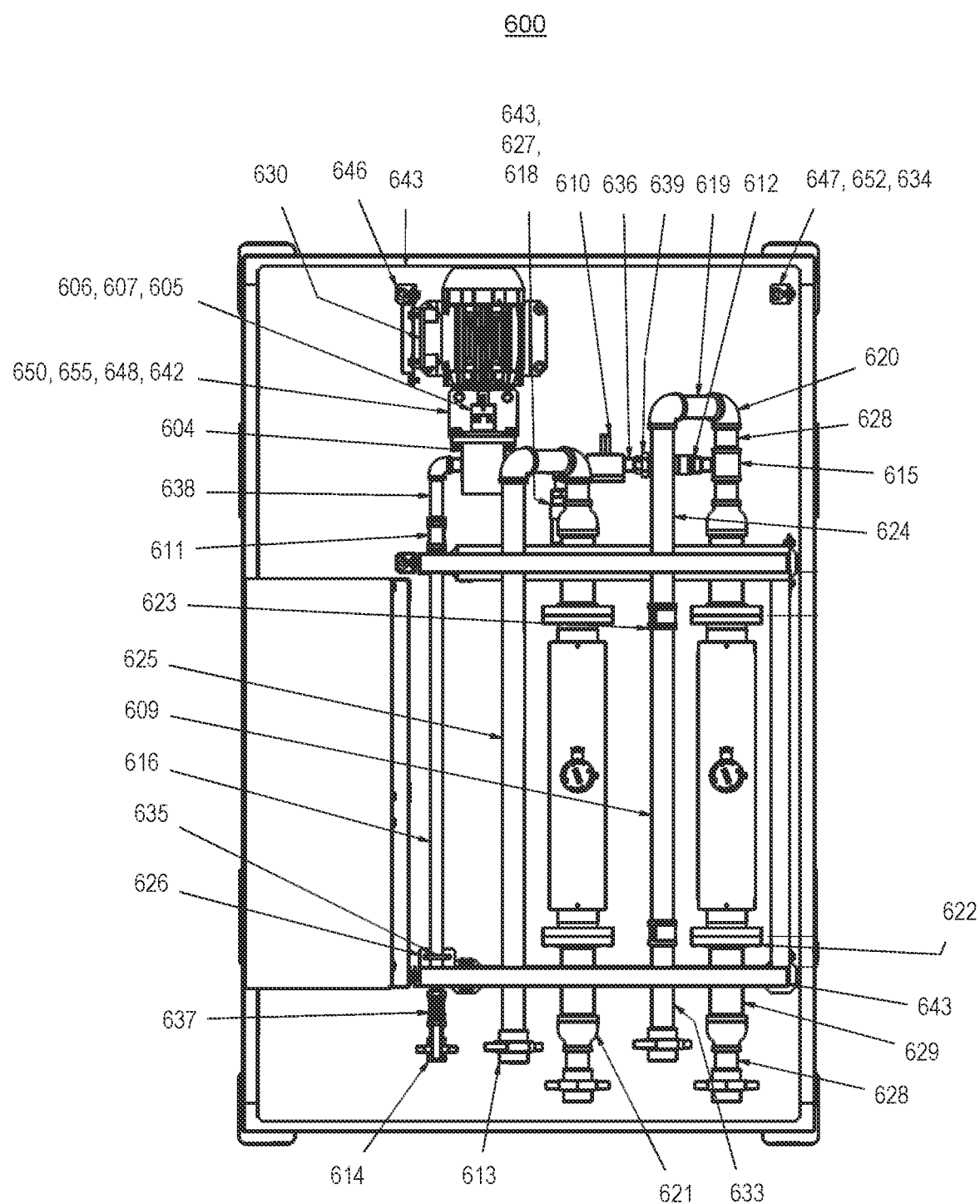
FIG. 8 illustrates an example of a system.

FIG. 6, FIG. 7 and FIG. 8 show an example of a system 600 that can be a skid-based system. As shown in FIG. 6, the system 600 can include skid weldments 643 for mounting equipment to a skid 690.

FIG. 7 shows the example system 600, which can include one or more instances of one or more of a motor 603, an oil pump 604, a coupling 605, a Coriolis flow meter 608, a static mixer 609, a Y-strainer 611, a union 613, a union 614, a reducing tee 615, an oil pipe member 616, an elbow 617, a nipple 619, an elbow 620, a straight reducer 621, a flange 622, a coupling 623, a static mixer entrance 624, a nipple 628, a nipple 629, a motor mount 630, a static mixer entrance 633, a washer 634, a nipple 636, a ball valve 637, a nipple 638, a main cover 640, a pump mount 642, and a bolt 654.

As shown in the example system 600 of FIG. 8, the system 600 can include one or more instances of one or more of an oil pump 604, a coupling 605, a coupling 606, a coupling 607, a static flow mixer 609, a flow meter 610, a Y-strainer 611, a check valve 612, a union 613, a union 614, a reducing tee 615, an oil pipe member 616, a pressure relief valve 618, a nipple 619, an elbow 620, a straight reducer 621, a flange 622, a coupling 623, a static mixer entrance 624, a pipe 625, an oil pipe support 626, a tee connector 627, a nipple 628, a nipple 629, a motor mount 630, a static mixer entrance 633, a washer 634, a U-bolt 635, a nipple 636, a ball valve 637, a nipple 638, a union 639, a pump mount 642, a skid weldment 643, a motor side cover mount 646, a pump mount washer 648, a bolt 652, and a bolt 655.

As an example, the system 600 can include one or more features of the system 500 of FIG. 5.

As explained, centrifuges are generally a type of device in situ most capable of removing the finest of the solids present in a drilling system. Removal of fines can have a positive impact on rheology, and therefore fluid performance. The centrifuge itself can be viewed as a measurement instrument when one considers that the density of the effluent in situ, compared to the ideal density of clean slurry, represents the minimum density requiring dilution. That is, the density difference between actual effluent and clean slurry represents the density provided to the fluid by ultra-fine solids that are incapable of being mechanically removed.

Figure 9:
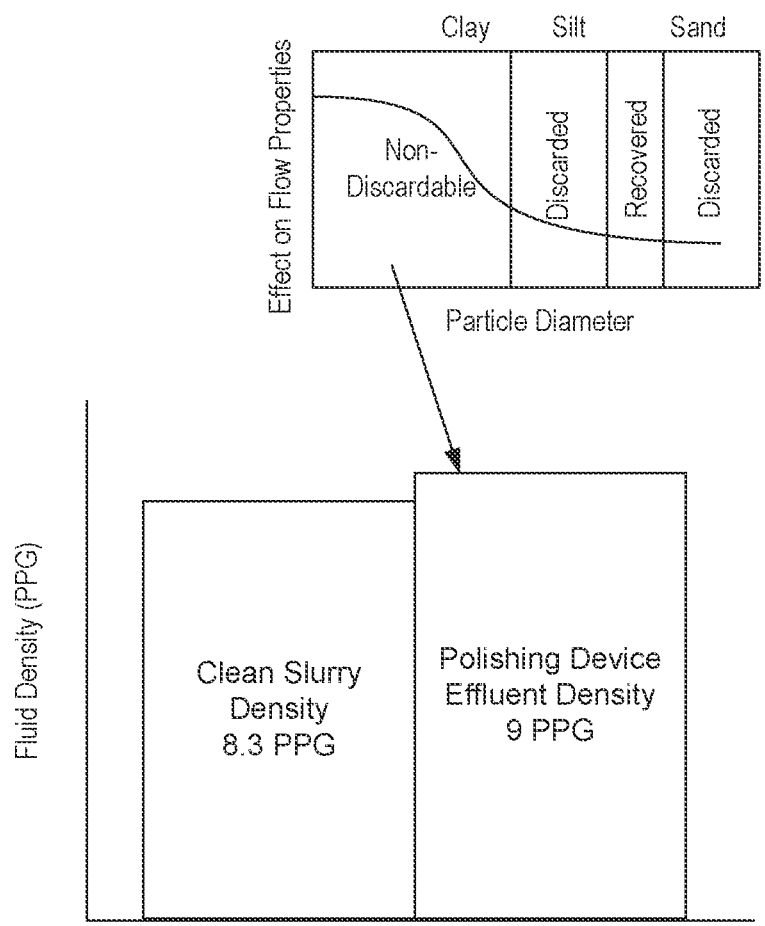
FIG. 9 illustrates examples of plots.

FIG. 9 shows example plots 900 of relative effect on flow properties versus particle diameter and clean slurry density (e.g., 8.3 PPG) and polishing device effluent density (e.g., 9 PPG) where non-discardable, discarded and recovered particle sizes are indicated, with respect generally to sizes for clay, silt and sand.

As explained, by simultaneously measuring the rate of feed to the centrifuge, and the density difference between actual effluent and clean slurry densities a simple dilution equation can be performed to dilute the non-discardable solids in real time. This alone can allow for dilution to become automated and actively moderated. However, by employing ADM injection and mixing technologies, in conjunction with ADM programming capabilities, a mechanical advantage can be created at the centrifuge whereby the prescribed dilution—the dilution required to dilute the effluent to the target density—is not consumed at the mathematical rate. That is, the use of dilution in a mixing process flow creates mechanical advantages in the centrifuge not otherwise attainable.

The mechanical advantage created can be calculated as the measured centrifuge effluent density less the strict mechanical density at the prescribed dilution rate. The resulting additional cut, seen as PPG (pounds per gallon), can be extrapolated out to additional total solids removed. Further, an ADM can measure this additional removal in real time and self-adjust its rate of dilution introduction only ever providing the minimum volume required to reach the goal density.

Figure 10:
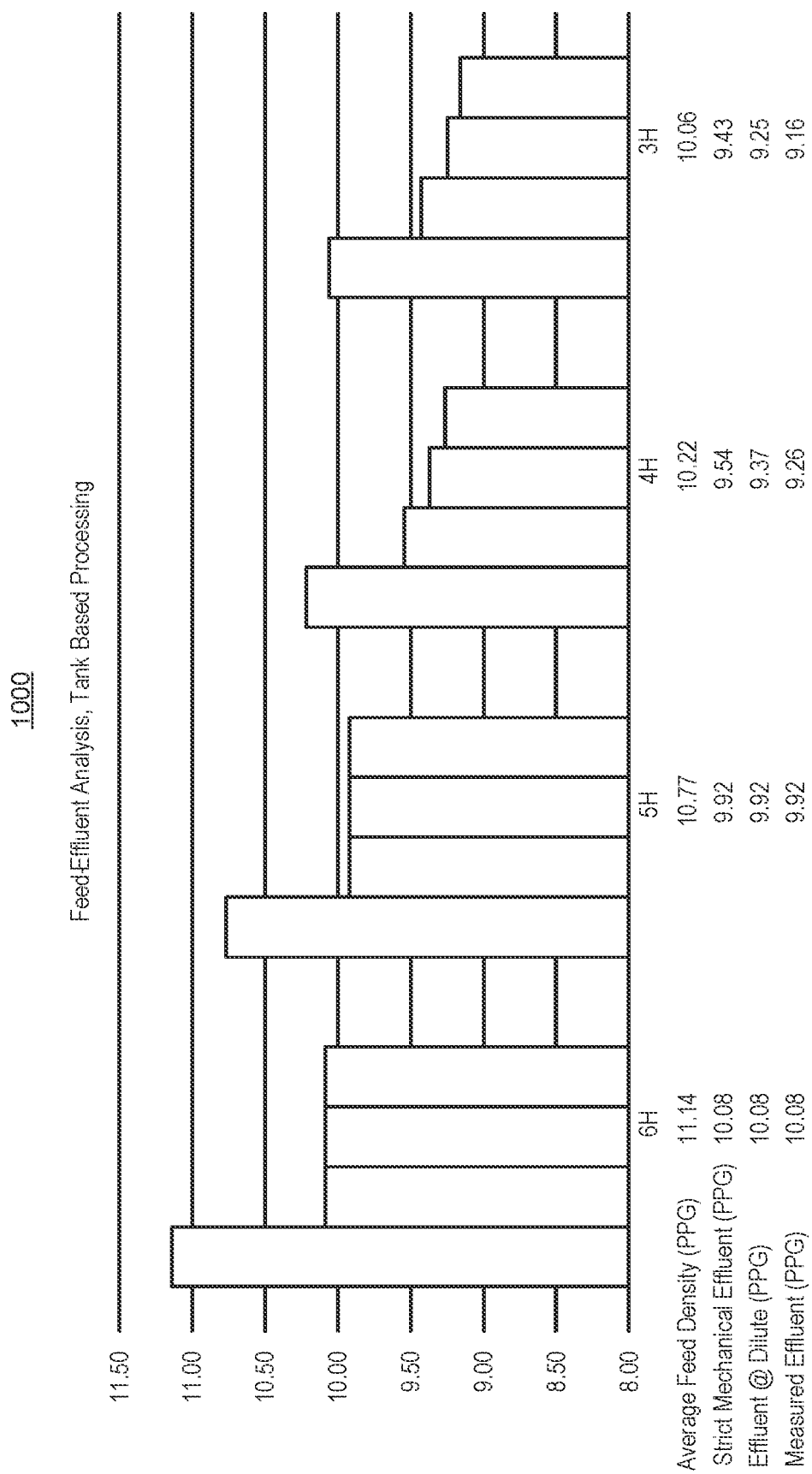
FIG. 10 illustrates examples of plots.

FIG. 10 shows an example plot for various field trials for four wells, 6H, 5H, 4H and 3H. The trials were performed on a centrifuge rigged to a tank. Fluid is received to the tank from the drying shaker reclaim at a density of 10.5-11.5 PPG, and from a barite recovery centrifuge at a density of 10.2-10.8 PPG. The monitored centrifuge prepares this fluid for transfer to a final stage of polishing (e.g., via RHEUSE technology, marketed by M-I SWACO).

Upon normalization of measurement operations a trial began on the 4H well, which was intermittent and non-contiguous. In total an ADM "Fixed Volume" program was in active use for 48 hours. This usage time did not occur contiguously, but rather represents the total testing time intermittently dispersed across 6 drilling days.

No dilution beyond historical normalized use was utilized during testing. Dilution on the 6H and 5H wells occurred in the stage 2 RHEUSE tank according to prior best practices. For the 4H well, the dilution volumes were translated to a feed rate which was input to the ADM "Fixed Volume" programming. The ADM maintained this rate of injection accurately and the programming was started and stopped by onsite personnel at the prescribed testing intervals. Generally, testing intervals were confined to 4 hours to remain consistent to the historical rate of diesel consumption for the RHEUSE system: 20 BBL/100 BBL batch/4 hours, translating to an ADM injection rate of 3.5 GPM. However, it was noted that the ADM allowed for an extreme acceleration of process often reaching densities below the target density in less than the prescribed run time. As the rate of consumption remained consistent to historical normative use, mechanical separation advantages created are attributed to the ADM mix and inject hardware coupled with the programmed controls in the PLC. As an example, 520 BBL of RHEUSE slurry were produced on the highest ADM use day as compared to historical averages of 350-400 BBL.

As the 4H well was concluded, the trial moved to the 3H well. For the 3H well the ADM was run in a fully automatic mode. A desired effluent density was selected as input to the ADM. The measure, mix, and inject technologies on-board the ADM were driven by the programming for this well. The ADM alone selected and actively manipulated the use of 60 percent of the diesel consumed as dilution for the 3H well. Diesel consumption rate analysis provided metrics in gallons per foot, with a substantial reduction (e.g., by almost 1 gallon per foot) for non-ADM versus ADM in automatic mode. The fixed mode for the ADM provided a reduction of approximately 0.4 gallon per foot.

When viewed as an entire pad, findings included a 14 percent decline in total diesel gallons utilized per drilling foot using the ADM's fixed mode, and an impressive reduction of 27% utilizing the ADM's automatic mode. These savings can be tracked volumetrically by the ADM. The 4H (Fixed Mode) and 3H (Automatic Mode) well savings by measurement—the difference between the cut induced by the ADM methodology, versus what the cut would have been without the ADM—(diesel calculated at $5.00/Gal) equated to $41,557.33 on the 4H, and $48,460.94 on the 3H. The fluids volume tracking, or the reduction seen as gallons per foot used, placed the actual consumption savings at $24,360.00 on the 4H, and $47,250.00 on the 3H. Such savings in fluid (e.g., oil such as diesel oil for mud and/or one or more other fluids) utilized are from dilute reduction alone. However, additional savings can be from whole fluid treatment, trucking and waste impacts from use of an ADM. Furthermore, the ADM wells averaged a nearly 30 feet per hour improvement to the average rate of penetration, or roughly 14 percent.

Figure 11:
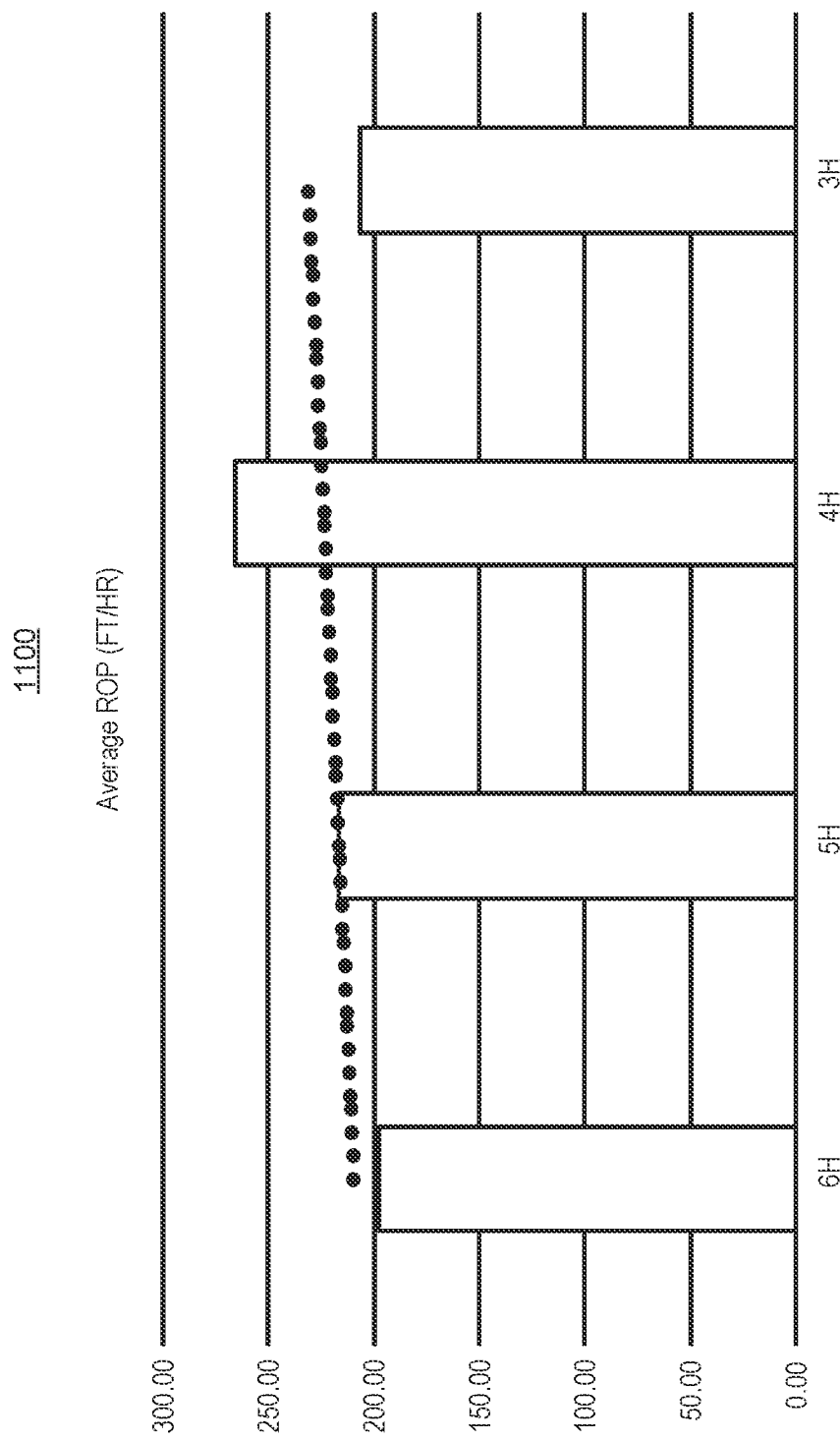
FIG. 11 illustrates an example of a plot.

FIG. 11 shows an example plot of average rate of penetration (ROP) in feet per hour for the four wells. As explained, use of ADM technology can improve ROP.

In terms of understanding the quality of the additional solids removed, consider a RHEUSE batch, post polishing centrifuge particle size analysis. Such an analysis was performed that demonstrated additional efficiencies gained in terms of "cut", the difference in end effluent density, are consistent across the particle size gradient leaning slightly towards large solids. This correlates suitably to Stoke's Law, which provides information as to the observation that energy required to remove progressively finer particles incrementally increases. As ADM technology is also subservient to Stoke's Law, the additional solids being removed as a result of an ADM guided process are also finer than what would have been removed by previous normative operations. Ultimately, such an approach provides a driller (human and/or machine) with a cleaner fluid in terms of total solids concentration and improved in terms of rheological profile. Further, the targeting of fines in a fluid system can extend the life of a fluid system by actively mitigating against solids degradation and the inability to mechanically remove them.

Figure 12:
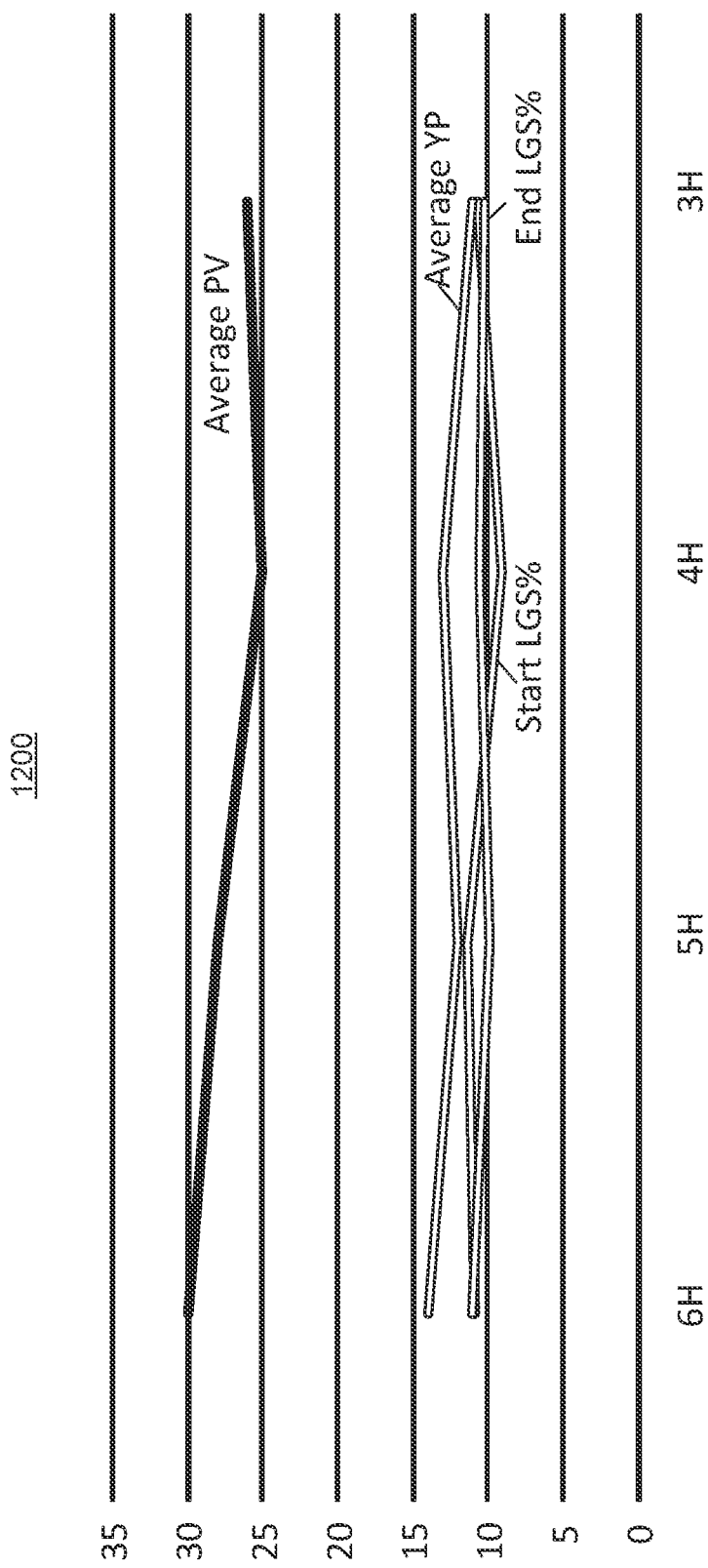
FIG. 12 illustrates an example of a plot.

FIG. 12 shows an example plot 1200 for the four wells 6H, 5H, 4H and 3H. As shown, use of ADM technology can provide for various efficiencies along with tracking of various types of information associated with one or more well related operations that involve use of fluid.

As to a mechanical separation improvement, use of the ADM programming and mixing technologies created a 0.1 PPG/M average improvement to the removal rate of the centrifuge. The improvement to the centrifuge removal rate was shown to be a 0.10 PPG/M removal rate gain that resulted in additional ultra-fine drill solids removal (e.g., 16.49 BBL on the 4H well and 19.23 BBL on the 3H well). As to centrifuge operational parameters, these were held stationary to isolate for ADM program impact. The ADM technology can also enable centrifuge parameters to be further adjusted.

As to dilution equivalent, to dilute 1 BBL of drill solids in a 2000 BBL system ranges from 10:1 to 14:1 depending on starting and ending (desired) concentrations. Therefore, estimated at a (Dilute: Drill Solids) BBL:BBL of 12:1, to achieve the same impact on concentration as the additional removal created by the ADM the operator would have needed to add: 197.89 BBL (4H) and 230.77 BBL (3H). At $5.00 per gallon, the equivalent dilute value of the ADM technology is: $41,557.33 (4H) and $48,460.94 (3H).

Various surface process density averages reduced on the 4H well and the 3H well, with a downward trend between the fixed and automatic modes. Trials demonstrated a general indication that the fluid is consistently and more rapidly kept cleaner than on the offset wells.

As to stage 2 (polishing/treatment) of RHEUSE technology, it can receive lower average density feed fluid resulting in an ability to retain higher performance mechanical parameters and reduce total process time. In trials, the ADM technology well average density transfer into stage 2 was 9.26 PPG; whereas, the non-ADM average density transfer into stage 2 was 10 PPG. As explained, results improved with the larger the portion of total diesel used entered through the ADM technology approach.

Figure 13:
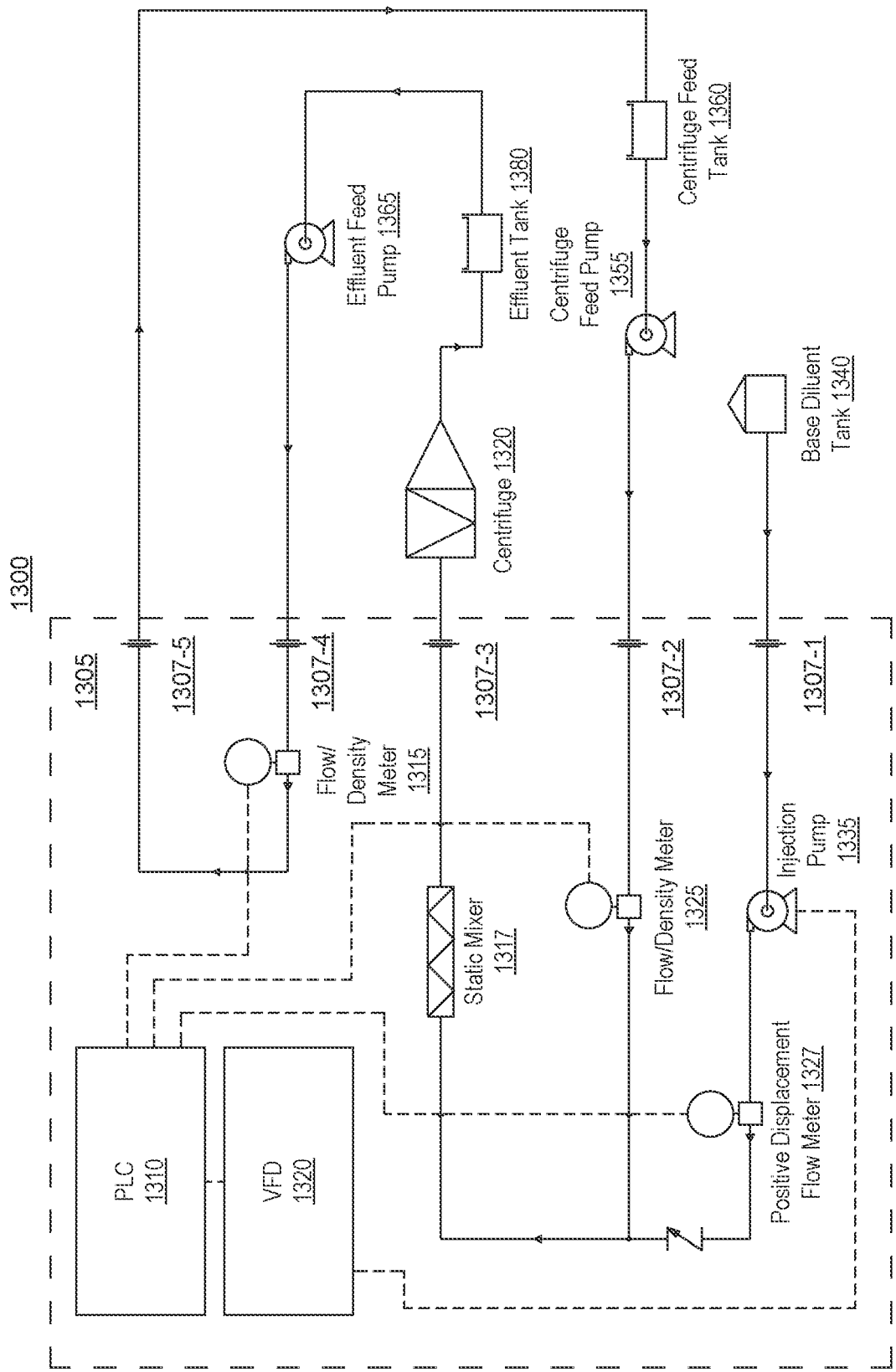
FIG. 13 illustrates an example of a system.

FIG. 13 shows an example of a system 1300 that includes a portion 1305 that can be a framework, which may be an ADM (e.g., an automated dilution module or computational framework). As shown, the system 1300 can include a PLC 1310, a VFD 1320, flow and density meters 1315 and 1325, a centrifuge 1320 as a type of sedimentation device, a positive displacement flow meter 1327, an injection pump 1335, a base diluent tank 1340 (e.g., oil or other fluid), a centrifuge feed pump 1355, a centrifuge tank 1360, an effluent feed pump 1365, and an effluent tank 1380. As shown, the VFD 1320 can provide instructions to the injection pump 1335 based on output from the PLC 1310 where the PLC 1310 can receive input from the flow and density meters 1315 and 1325 and the positive displacement flow meter 1327. As explained, a target density may be received by the PLC 1310 to regulate the injection pump 1335 to achieve the target density.

As shown in the example system 1300 of FIG. 13, fluid from the base diluent tank 1340 can be injected before the centrifuge 1320 such that a mixer such as, for example, the static mixer 1317 can mix the fluid with fluid from the centrifuge feed tank 1360 as pumped by the centrifuge feed pump 1355. As explained, during diluting of the fluid being fed to the centrifuge 1320, measurements can be acquired such that the impact of dilution can be ascertained. As explained, such measurements can be utilized to control the amount (e.g., rate) of fluid pumped for diluting such that a target density value can be achieved.

As an example, the system 1300 can include one or more features of the system 500 of FIG. 5 and/or the system 600 of FIG. 6, FIG. 7, and FIG. 8.

As an example, the portion 1305 may include one or more flanges 1307-1, 1307-2, 1307-3, 1307-4 and 1307-5 that can fluidly couple to various conduits such as, for example, a conduit of the base diluent tank 1340, a conduit of the centrifuge feed pump 1355, a conduit of the centrifuge 1320, a conduit of the effluent feed pump 1365 and a conduit of the effluent feed pump 1365 after the flow/density meter 1315. Such an approach can provide for skid mounted delivery, coupling and operation of the portion 1305.

As an example, a system may operate to acquire a set of measurements, which can include mass flow rate into a sedimentation device and mass flow rate out of a sedimentation device, density into a sedimentation device and density out of a sedimentation device, and a mass flow rate of a diluent. In the example of FIG. 13, the system 1300 shows acquisition of five different measurements, including mass flow rate from the flow meter 1327 as to diluent, mass flow rate and density from the flow meter 1315 and mass flow rate and density from the flow meter 1325.

FIG. 14 shows an example of a method 1400 that includes a reception block 1410 for receiving a target density value for a drilling fluid exiting a sedimentation device; a reception block 1420 for receiving a measured density value for the drilling fluid directed to the sedimentation device, a measured density value for the drilling fluid exiting the sedimentation device, and an incoming flow rate value for the drilling fluid directed to the sedimentation device; and a generation block 1430 for generating control instructions for control of an injection pump to regulate a diluent injection pump rate to dilute the drilling fluid entering the sedimentation device to achieve the target density value.

FIG. 14 also shows various computer-readable media (CRM) blocks 1411, 1421, and 1431. Such blocks can include instructions that are executable by one or more processors, which can be one or more processors of a computational framework, a system, a computer, etc. A computer-readable medium can be a computer-readable storage medium that is not a signal, not a carrier wave and that is non-transitory. For example, a computer-readable medium can be a physical memory component that can store information in a digital format.

In the example of FIG. 14, a system 1490 includes one or more information storage devices 1491, one or more computers 1492, one or more networks 1495 and instructions 1496. As to the one or more computers 1492, each computer may include one or more processors (e.g., or processing cores) 1493 and memory 1494 for storing the instructions 1496, for example, executable by at least one of the one or more processors. As an example, a computer may include one or more network interfaces (e.g., wired or wireless), one or more graphics cards, a display interface (e.g., wired or wireless), etc. The system 1490 can be specially configured to perform one or more portions of the method 1400 of FIG. 14.

As an example, one or more types of machine learning models may be utilized, which, for example, may supplement and/or supplant one or more types of meters. For example, a Coriolis meter may be a relatively expensive type of meter that can be modeled using a machine learning model to provide output using a less expensive type of meter, which may be or include a pressure meter, a flow meter, etc. As an example, a machine learning model may provide for a virtual flow meter.

As to types of machine learning models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model, which may be a machine learning model (ML model), may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system based platforms.

TENSORFLOW computations can be expressed as stateful dataflow graphs; noting that the name TENSORFLOW derives from the operations that such neural networks perform on multidimensional data arrays. Such arrays can be referred to as "tensors".

As an example, a method can include receiving a target density value for a drilling fluid exiting a sedimentation device; receiving a measured density value for the drilling fluid directed to the sedimentation device, a measured density value for the drilling fluid exiting the sedimentation device, and an incoming flow rate value for the drilling fluid directed to the sedimentation device; and generating control instructions for control of an injection pump to regulate a diluent injection pump rate to dilute the drilling fluid entering the sedimentation device to achieve a target density value. In such an example, the drilling fluid can include oil where, for example, the diluent injection pump rate specifies an oil injection pump rate for injection of oil as a diluent into the drilling fluid. In such an example, the oil may be a diesel type of oil. As an example, one or more other types of drilling fluids may be utilized, which may include water-based drilling fluid, noting that oil and/or water may be conserved by a framework (e.g., an oil base fluid, a water base fluid, etc.).

As an example, a sedimentation device can be or can include a centrifuge. As an example, one or more sedimentation devices may be utilized.

As an example, receiving a measured density value for the drilling fluid directed to the sedimentation device can include receiving the measured density value from a Coriolis meter. In such an example, the measured density value can be for the drilling fluid in a conduit prior to a mixing junction with a diluent conduit.

As an example, receiving a measured density value for the drilling fluid exiting the sedimentation device includes receiving the measured density value from a Coriolis meter.

As an example, a sedimentation device can causes sedimentation of solids in drilling fluid where, for example, at least a portion of the solids can be from drilling a borehole in a formation. As explained, drilling fluid may be pumped using pumps that may be driven by fuel, which may be a diesel fuel. Where drilling fluid can be more closely regulated to a desired density (e.g., mud weight), savings in running fluid pumps may be realized.

As an example, a method can include, based on control instructions for control of an injection pump, regulating a diluent injection pump rate to dilute drilling fluid entering a sedimentation device to achieve a target density value.

As an example, a diluent injection pump rate can cause dilution of drilling fluid to thereby increase sedimentation rate of solids in drilling fluid by a sedimentation device (e.g., solids removal from the drilling fluid). In such an example, the dilution of the drilling fluid can reduce the density of the drilling fluid. As an example, dilution of drilling fluid can reduce the viscosity of the drilling fluid.

As an example, a method can include generating control instructions for control of an injection pump automatically responsive to receiving one or more of the measured density value for the drilling fluid directed to the sedimentation device, the measured density value for the drilling fluid exiting the sedimentation device, and the incoming flow rate value for the drilling fluid directed to the sedimentation device.

As an example, generating control instructions for control of an injection pump can include utilizing a model. In such an example, the model can depend on one or more of measured density value for drilling fluid directed to a sedimentation device, measured density value for drilling fluid exiting a sedimentation device, and incoming flow rate value for drilling fluid directed to a sedimentation device.

As an example, a method can include determining a mechanical advantage for sedimentation by a sedimentation device based on a diluent injection pump rate. In such an example, the mechanical advantage can depend on a measured density value for drilling fluid directed to the sedimentation device and a measured density value for drilling fluid exiting the sedimentation device.

As an example, a system can include a processor; memory accessible by the processor; processor-executable instructions stored in the memory and executable to instruct the system to: receive a target density value for a drilling fluid exiting a sedimentation device; receive a measured density value for the drilling fluid directed to the sedimentation device, a measured density value for the drilling fluid exiting the sedimentation device, and an incoming flow rate value for the drilling fluid directed to the sedimentation device; and generate control instructions for control of an injection pump to regulate a diluent injection pump rate to dilute the drilling fluid entering the sedimentation device to achieve the target density value.

As an example, one or more computer-readable storage media can include processor-executable instructions to instruct a computing system to: receive a target density value for a drilling fluid exiting a sedimentation device; receive a measured density value for the drilling fluid directed to the sedimentation device, a measured density value for the drilling fluid exiting the sedimentation device, and an incoming flow rate value for the drilling fluid directed to the sedimentation device; and generate control instructions for control of an injection pump to regulate a diluent injection pump rate to dilute the drilling fluid entering the sedimentation device to achieve the target density value.

As an example, a system can include a controller that includes: one or more interfaces for receipt of a measured density value for drilling fluid directed to a sedimentation device, a measured density value for the drilling fluid exiting the sedimentation device, and an incoming flow rate value for the drilling fluid directed to the sedimentation device and for transmission of a control signal to an injection pump for pumping diluent into the drilling fluid before the sedimentation device; and control circuitry for generation of the control signal based at least in part on one or more of the measured density values and the incoming flow rate value. In such an example, the control circuitry can include a processor and memory accessible to the processor to execute instructions to generate the control signal. As an example, the control signal may aim to control density of the drilling fluid exiting a sedimentation device where, for example, a pre-determined density value may be provided. In such an example, the drilling fluid may be used for one or more drilling operations to deepen a borehole in a formation.

As an example, a control signal can be for a variable frequency drive unit operatively coupled to an injection pump. As an example, a system can include a variable frequency drive unit that operatively couples to an injection pump.

As an example, a system can include at least one flow meter and/or at least one density meter. As an example, a system can include at least one Coriolis meter that can measure density and mass flow.

As an example, a system can include a positive displacement flow meter. In such an example, the positive displacement flow meter can be positioned with respect to a conduit downstream from the injection pump.

As an example, a system can include a static mixer. In such an example, the static mixer can be positioned downstream from a junction between a drilling fluid conduit and a diluent conduit. As an example, a system can include a check valve that is positioned downstream from an injection pump.

As an example, a system can include a skid, where at least a controller is mounted to the skid. As an example, a controller can be or include a programmable logic controller (PLC). As an example, a system can include flanges that fluidly couple to at least a diluent tank conduit, a sedimentation device feed pump conduit, and a sedimentation device conduit.

As an example, a skid-mounted system can include fluid meters; a diluent injection pump; and a controller that includes control circuitry for generation of a control signal for the diluent injection pump based at least in part on one or more outputs of the fluid meters for dilution of drilling fluid. In such an example, the fluid meters can include at least one density meter. As an example, fluid meters can include at least one mass flow meter and/or at least one density meter.

As an example, fluid meters can include at least one Coriolis meter where, for example, the at least one Coriolis meter measures density and mass flow.

As an example, a skid-mounted system can include flanges that fluidly couple to at least a diluent tank conduit, a sedimentation device feed pump conduit, and a sedimentation device conduit. As an example, a skid-mounted system can generate a control signal for a diluent injection pump that controls density of drilling fluid with respect to a pre-determined density value.

As explained, a system may be skid mounted (see, e.g., FIGS. 6, 7 and 8 and/or FIG. 13). Such a system can provide for dilution of drilling fluid at least before the drilling fluid enters a sedimentation device or sedimentation devices where, for example, dilution can result in an increase in sedimentation rate of solids in the drilling fluid while, for example, also meeting a targeted drilling fluid density value. In such an example, the drilling fluid can be tailored to meet a desired density for use in drilling operations.

As an example, a method may be implemented in part using computer-readable media (CRM), for example, as a module, a block, etc. that include information such as instructions suitable for execution by one or more processors (or processor cores) to instruct a computing device or system to perform one or more actions. As an example, a single medium may be configured with instructions to allow for, at least in part, performance of various actions of a method. As an example, a computer-readable medium (CRM) may be a computer-readable storage medium (e.g., a non-transitory medium) that is not a carrier wave. As an example, a computer-program product can include instructions suitable for execution by one or more processors (or processor cores) where the instructions can be executed to implement at least a portion of a method or methods.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 15:
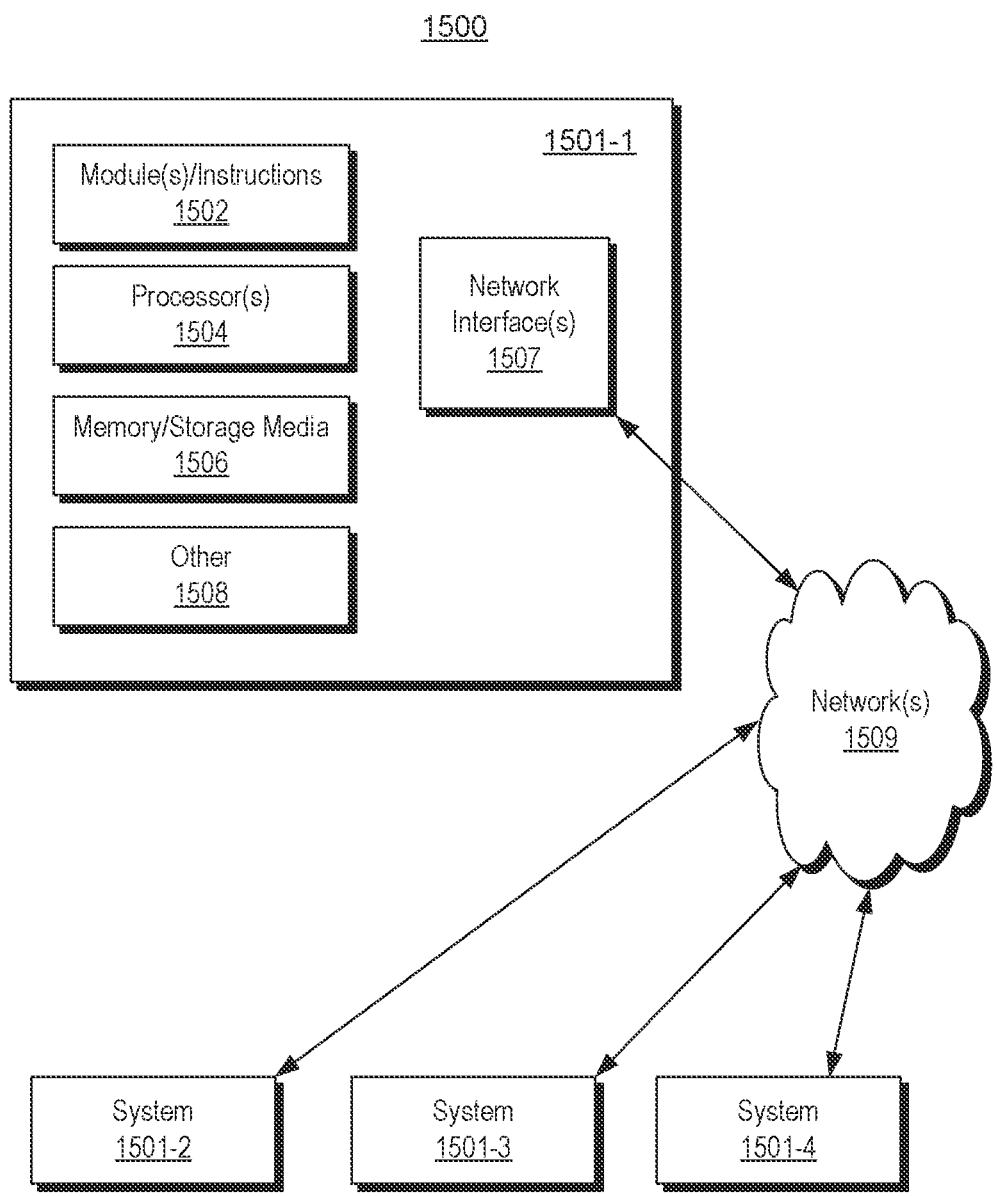
FIG. 15 illustrates an example of computing system.

In some embodiments, a method or methods may be executed by a computing system. FIG. 15 shows an example of a system 1500 that can include one or more computing systems 1501-1, 1501-2, 1501-3 and 1501-4, which may be operatively coupled via one or more networks 1509, which may include wired and/or wireless networks.

As an example, a system can include an individual computer system or an arrangement of distributed computer systems. In the example of FIG. 15, the computer system 1501-1 can include one or more modules 1502, which may be or include processor-executable instructions, for example, executable to perform various tasks (e.g., receiving information, requesting information, processing information, simulation, outputting information, etc.).

As an example, a module may be executed independently, or in coordination with, one or more processors 1504, which is (or are) operatively coupled to one or more storage media 1506 (e.g., via wire, wirelessly, etc.). As an example, one or more of the one or more processors 1504 can be operatively coupled to at least one of one or more network interface 1507. In such an example, the computer system 1501-1 can transmit and/or receive information, for example, via the one or more networks 1509 (e.g., consider one or more of the Internet, a private network, a cellular network, a satellite network, etc.). As shown, one or more other components 1508 can be included in the computer system 1501-1.

As an example, the computer system 1501-1 may receive from and/or transmit information to one or more other devices, which may be or include, for example, one or more of the computer systems 1501-2, etc. A device may be located in a physical location that differs from that of the computer system 1501-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1506 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
receiving a target density value for a drilling fluid exiting a sedimentation device;
receiving a measured density value for the drilling fluid directed to the sedimentation device, a measured density value for the drilling fluid exiting the sedimentation device, and an incoming flow rate value for the drilling fluid directed to the sedimentation device; and
generating control instructions for control of an injection pump to regulate a diluent injection pump rate to dilute the drilling fluid entering the sedimentation device to achieve the target density value.

2. The method of claim 1, wherein the drilling fluid comprises oil and wherein the diluent injection pump rate specifies an oil injection pump rate for injection of oil as a diluent into the drilling fluid.

3. The method of claim 1, wherein the receiving the measured density value for the drilling fluid directed to the sedimentation device comprises receiving the measured density value from a Coriolis meter and wherein the measured density value is for the drilling fluid in a conduit prior to a mixing junction with a diluent conduit.

4. The method of claim 1, wherein the receiving the measured density value for the drilling fluid exiting the sedimentation device comprises receiving the measured density value from a Coriolis meter.

5. The method of claim 1, wherein the sedimentation device causes sedimentation of solids in the drilling fluid and wherein at least a portion of the solids are from drilling a borehole in a formation.

6. The method of claim 1, comprising, based on the control instructions for control of the injection pump, regulating the diluent injection pump rate to dilute the drilling fluid entering the sedimentation device to achieve a target density value.

7. The method of claim 1, wherein the diluent injection pump rate causes dilution of the drilling fluid to thereby increase sedimentation rate of solids in the drilling fluid by the sedimentation device.

8. The method of claim 7, wherein the dilution of the drilling fluid reduces at least one of the density of the drilling fluid and the viscosity of the drilling fluid.

9. The method of claim 1, comprising generating the control instructions for control of the injection pump automatically responsive to receiving one or more of the measured density value for the drilling fluid directed to the sedimentation device, the measured density value for the drilling fluid exiting the sedimentation device, and the incoming flow rate value for the drilling fluid directed to the sedimentation device.

10. The method of claim 1, wherein generating the control instructions for control of the injection pump comprises utilizing a model and wherein the model depends on one or more of the measured density value for the drilling fluid directed to the sedimentation device, the measured density value for the drilling fluid exiting the sedimentation device, and the incoming flow rate value for the drilling fluid directed to the sedimentation device.

11. The method of claim 1, comprising determining a mechanical advantage for sedimentation by the sedimentation device based on the diluent injection pump rate.

12. The method of claim 11, wherein the mechanical advantage depends on the measured density value for the drilling fluid directed to the sedimentation device and the measured density value for the drilling fluid exiting the sedimentation device.

13. A system comprising:
a processor;
memory accessible by the processor;
processor-executable instructions stored in the memory and executable to instruct the system to:
receive a target density value for a drilling fluid exiting a sedimentation device;
receive a measured density value for the drilling fluid directed to the sedimentation device, a measured density value for the drilling fluid exiting the sedimentation device, and an incoming flow rate value for the drilling fluid directed to the sedimentation device; and
generate control instructions for control of an injection pump to regulate a diluent injection pump rate to dilute the drilling fluid entering the sedimentation device to achieve the target density value.

14. One or more computer-readable storage media comprising processor-executable instructions to instruct a computing system to:
receive a target density value for a drilling fluid exiting a sedimentation device;
receive a measured density value for the drilling fluid directed to the sedimentation device, a measured density value for the drilling fluid exiting the sedimentation device, and an incoming flow rate value for the drilling fluid directed to the sedimentation device; and
generate control instructions for control of an injection pump to regulate a diluent injection pump rate to dilute the drilling fluid entering the sedimentation device to achieve the target density value.

15. A system comprising:
a controller that comprises:
one or more interfaces for receipt of a measured density value for drilling fluid directed to a sedimentation device, a measured density value for the drilling fluid exiting the sedimentation device, and an incoming flow rate value for the drilling fluid directed to the sedimentation device and for transmission of a control signal to an injection pump for pumping diluent into the drilling fluid before the sedimentation device; and
control circuitry for generation of the control signal based at least in part on one or more of the measured density values and the incoming flow rate value.

16. The system of claim 15, further comprising a variable frequency drive unit that operatively couples to the injection pump and wherein the control signal is for a variable frequency drive unit operatively coupled to the injection pump.

17. The system of claim 15, further comprising at least one of a flow meter and a density meter.

18. The system of claim 15, further comprising at least one of a Coriolis meter that can measure density and mass flow, a positive displacement flow meter that is positioned with respect to conduit downstream from the injection pump, a static mixer positioned downstream from a junction between a drilling fluid conduit and diluent conduit, and a check valve that is positioned downstream from the injection pump.

19. The system of claim 15, further comprising flanges that fluidly couple to at least a diluent tank conduit, a sedimentation device feed pump conduit, and a sedimentation device conduit.

* * * * *